(12) United States Patent
Eisen et al.

(10) Patent No.: US 10,574,643 B2
(45) Date of Patent: Feb. 25, 2020

(54) SYSTEMS AND METHODS FOR DISTRIBUTION OF SELECTED AUTHENTICATION INFORMATION FOR A NETWORK OF DEVICES

(71) Applicant: TRUSONA, INC., Scottsdale, AZ (US)

(72) Inventors: Ori Eisen, Scottsdale, AZ (US); Nikolas Mangu-Thitu, Lexington, KY (US)

(73) Assignee: TRUSONA, INC., Scottsdale, AZ (US)

(*) Notice: Subject to any disclaimer, the term of this patent is extended or adjusted under 35 U.S.C. 154(b) by 0 days.

(21) Appl. No.: 16/294,642

(22) Filed: Mar. 6, 2019

(65) Prior Publication Data

US 2019/0281036 A1   Sep. 12, 2019

Related U.S. Application Data

(63) Continuation of application No. PCT/US2017/050783, filed on Sep. 8, 2017.
(Continued)

(51) Int. Cl.
*H04L 29/06* (2006.01)
*G06F 21/45* (2013.01)
(Continued)

(52) U.S. Cl.
CPC .............. *H04L 63/08* (2013.01); *G06F 21/31* (2013.01); *G06F 21/45* (2013.01); *G06Q 20/12* (2013.01);
(Continued)

(58) Field of Classification Search
CPC ....... H04L 63/08; H04L 63/105; G06F 21/31; G06F 21/32; G06F 21/34; G06F 21/45;
(Continued)

(56) References Cited

U.S. PATENT DOCUMENTS

| 5,913,542 A | 6/1999 | Belucci et al. |
| 6,871,287 B1* | 3/2005 | Ellingson ................ G06F 21/32 382/115 |

(Continued)

FOREIGN PATENT DOCUMENTS

| EP | 2107757 A1 | 10/2009 |
| JP | 4961214 B2 | 6/2012 |

(Continued)

OTHER PUBLICATIONS

International Search Report and Written Opinion dated Dec. 14, 2017 for International PCT Patent Application No. PCT/US2017050783.
(Continued)

*Primary Examiner* — Hosuk Song
(74) *Attorney, Agent, or Firm* — Wilson Sonsini Goodrich & Rosati

(57) ABSTRACT

A system for facilitating distribution of authentication information for a network of devices to be authenticated is provided. The system comprises: an authentication module configured to obtain an identity-proofing confidence score, based on data about identity-proofing of a user obtained from an authentication service system, wherein the data about identity-proofing comprises a type of identity document of the user and a presentation method used for verifying the user's identity by the authentication service system; and an insurance module in communication with the authentication module, configured to generate a plurality of security levels for the user, wherein each of the plurality of security levels is generated based on the identity-proofing confidence score and a credential authentication confidence score that is (1) obtained with aid of at least one device from the network of devices, and (2) determined based on a credential to be used for a transaction and a presence of an anti-replay feature about the at least one device, wherein a
(Continued)

display is configured to show a plurality of coverage plans associated with the plurality of security levels to the user for selection, such that the authentication service system performed credential authentication according to a selected coverage plan.

16 Claims, 13 Drawing Sheets

Related U.S. Application Data

(60) Provisional application No. 62/385,712, filed on Sep. 9, 2016.

(51) Int. Cl.
| | |
|---|---|
| *G06Q 20/40* | (2012.01) |
| *G06Q 40/08* | (2012.01) |
| *H04L 9/32* | (2006.01) |
| *G06Q 20/38* | (2012.01) |
| *G06F 21/31* | (2013.01) |
| *G06Q 20/12* | (2012.01) |

(52) U.S. Cl.
CPC ....... *G06Q 20/385* (2013.01); *G06Q 20/4012* (2013.01); *G06Q 20/4014* (2013.01); *G06Q 20/4016* (2013.01); *G06Q 20/40145* (2013.01); *G06Q 40/08* (2013.01); *H04L 9/3226* (2013.01); *H04L 63/105* (2013.01)

(58) Field of Classification Search
CPC ......... G06Q 20/4014; G06Q 20/40145; G06Q 40/08
See application file for complete search history.

(56) References Cited

U.S. PATENT DOCUMENTS

| | | | |
|---|---|---|---|
| 7,379,921 B1 | 5/2008 | Kiliccote | |
| 7,578,436 B1 | 8/2009 | Kiliccote et al. | |
| 7,613,929 B2 | 11/2009 | Cohen et al. | |
| 7,941,835 B2 * | 5/2011 | Wolfond | G06F 21/31 713/186 |
| 8,224,753 B2 | 7/2012 | Atef et al. | |
| 8,239,677 B2 * | 8/2012 | Colson | G06F 21/34 713/166 |
| 8,275,636 B2 | 9/2012 | Berg et al. | |
| 8,291,220 B2 | 10/2012 | Singh | |
| 8,385,971 B2 | 2/2013 | Rhoads et al. | |
| 8,550,903 B2 | 10/2013 | Lyons et al. | |
| 8,631,486 B1 | 1/2014 | Friedman et al. | |
| 8,655,782 B2 | 2/2014 | Poon et al. | |
| 8,805,110 B2 | 8/2014 | Rodriguez et al. | |
| 8,929,877 B2 | 1/2015 | Rhoads et al. | |
| 8,973,095 B2 | 3/2015 | Smith et al. | |
| 8,983,207 B1 | 3/2015 | Ran et al. | |
| 9,118,662 B2 | 8/2015 | Corrion et al. | |
| 9,143,496 B2 | 9/2015 | Etchegoyen | |
| 9,596,237 B2 | 3/2017 | Law et al. | |
| 9,805,213 B1 * | 10/2017 | Kragh | G06F 16/245 |
| 10,284,548 B2 * | 5/2019 | Williams | G06Q 50/265 |
| 10,424,000 B2 * | 9/2019 | Chow | G06Q 30/0282 |
| 2005/0187798 A1 | 8/2005 | Conn et al. | |
| 2007/0063050 A1 | 3/2007 | Attia et al. | |
| 2007/0102521 A1 | 5/2007 | Petersson et al. | |
| 2008/0073428 A1 | 3/2008 | Davis | |
| 2008/0127296 A1 | 5/2008 | Carroll et al. | |
| 2009/0150294 A1 | 6/2009 | March et al. | |
| 2010/0268949 A1 | 10/2010 | Schuetze | |
| 2011/0047628 A1 | 2/2011 | Viars | |
| 2011/0200234 A1 | 8/2011 | Takahashi et al. | |
| 2011/0219427 A1 | 9/2011 | Hito et al. | |
| 2012/0150742 A1 | 6/2012 | Poon et al. | |
| 2012/0278876 A1 | 11/2012 | McDonald et al. | |
| 2012/0290482 A1 | 11/2012 | Atef et al. | |
| 2013/0116964 A1 | 5/2013 | Van Roermund et al. | |
| 2013/0204880 A1 | 8/2013 | Lesiecki et al. | |
| 2013/0226812 A1 | 8/2013 | Landrok et al. | |
| 2014/0105449 A1 | 4/2014 | Caton et al. | |
| 2014/0282933 A1 | 9/2014 | Etchegoyen | |
| 2014/0283113 A1 | 9/2014 | Hanna et al. | |
| 2014/0289833 A1 | 9/2014 | Briceno et al. | |
| 2014/0325220 A1 | 10/2014 | Tunnell et al. | |
| 2014/0337930 A1 | 11/2014 | Hoyos et al. | |
| 2015/0058950 A1 | 2/2015 | Miu et al. | |
| 2015/0178724 A1 | 6/2015 | Ngo et al. | |
| 2015/0254443 A1 | 9/2015 | Blessing et al. | |
| 2016/0057248 A1 | 2/2016 | Tankha et al. | |
| 2016/0140357 A1 | 5/2016 | Newell | |
| 2017/0251014 A1 | 8/2017 | Eisen | |
| 2019/0147159 A1 | 5/2019 | Eisen | |

FOREIGN PATENT DOCUMENTS

| | | |
|---|---|---|
| KR | 101441619 B1 | 9/2014 |
| WO | WO-2014075011 A1 | 5/2014 |
| WO | WO-2016141352 A1 | 9/2016 |
| WO | WO-2017147494 A1 | 8/2017 |
| WO | WO-2018022993 A1 | 2/2018 |
| WO | WO-2018049234 A1 | 3/2018 |

OTHER PUBLICATIONS

International Search Report and Written Opinion dated Nov. 1, 2017 for International Patent Application No. PCT/US2017/044371.
EP17757353.2 The Extended European Search Report dated Jun. 11, 2019.
International Search Report and Written Opinion dated May 15, 2017 for International PCT Patent Application No. PCT/US2017/019454.
U.S. Appl. No. 15/441,661 Office Action dated Jan. 8, 2019.
U.S. Appl. No. 15/441,661 Office Action dated Jul. 30, 2019.
PCT/US2019/047964 International Search Report dated Dec. 13, 2019.

* cited by examiner

| ID material | Document Confidence score |
|---|---|
| Social security card | 20% |
| Driver license | 40% |
| Passport | 80% |
| E-passport | 100% |

201

| ID material presentation | Presentation Confidence score |
|---|---|
| Know | 20% |
| Show | 40% |
| Present | 80% |
| Prove | 100% |

203

Document confidence% * Presentation confidence% * Other factors% = Identity-proofing confidence%

| IPC % | Document confidence | Presentation confidence | location | ... |
|---|---|---|---|---|
| 20%*20%=4% | Social Security Card=20% | Know=20% | | |
| 20%*40%=8% | Social Security Card=20% | Show=40% | | |
| 20%*80%=16% | Social Security Card=20% | Present=80% | | |
| 20%*100%=20% | Social Security Card=20% | Prove=100% | | |
| 40%*20%=8% | Divers license=40% | Know=20% | | |
| 40%*40%=16% | Divers license=40% | Show=40% | | |
| 40%*80%=32% | Divers license=40% | Present=80% | | |
| 40%*100%=40% | Divers license=40% | Prove=100% | | |
| 80%*20%=16% | Passport=80% | Know=20% | | |
| 80%*40%=32% | Passport=80% | Show=40% | | |
| 80%*80%=64% | Passport=80% | Present=80% | | |
| 80%*100%=80% | Passport=80% | Prove=100% | | |
| 100%*20%=20% | E-passport=100% | Know=20% | | |
| 100%*40%=40% | E-passport=100% | Show=40% | | |
| 100%*80%=80% | E-passport=100% | Present=80% | | |
| 100%*100%=100% | E-passport=100% | Prove=100% | | |
| 80%*20%*40%=6.4% | Passport=80% | Know=20% | Office=40% | |
| 80%*40%*20%=6.4% | Passport=80% | Show=40% | Home=20% | |
| ... | ... | ... | ... | ... |

| User Credentials | Confidence score |
|---|---|
| User name/password | 20% |
| QR code | 40% |
| OTP token | 80% |
| Biometric reader | 100% |

503

| Anti-replay presence | Anti-replay score |
|---|---|
| No anti-replay | 20% |
| Anti-replay | 100% |

505

Credential confidence% * Anti-replay present % * Other factors% = User credential confidence%

FIG. 5

| CREDENTIAL CONFIDENCE | ANTI-PRELAY PRESENT | IPC% |
|---|---|---|
| User name/password = 20% | No Anti-Replay = 20% | 20% * 20% = 4% |
| User name/password = 20% | Anti-Replay = 100% | 20% * 100% = 20% |

| CREDENTIAL CONFIDENCE | ANTI-PRELAY PRESENT | IPC% |
|---|---|---|
| QR code = 40% | No Anti-Replay = 20% | 40% * 20% = 8% |
| QR code = 40% | Anti-Replay = 100% | 40% * 100% = 40% |

| CREDENTIAL CONFIDENCE | ANTI-PRELAY PRESENT | IPC% |
|---|---|---|
| OTP Token = 80% | No Anti-Replay = 20% | 80% * 20% = 16% |
| OTP Token = 80% | Anti-Replay = 100% | 80% * 100% = 80% |

| CREDENTIAL CONFIDENCE | ANTI-PRELAY PRESENT | IPC% |
|---|---|---|
| Biometric Reader = 100% | No Anti-Replay = 20% | 100% * 20% = 20% |
| Biometric Reader = 100% | Anti-Replay = 100% | 100% * 100% = 100% |

FIG. 6

| A+ Rated Insurance Carrier Coverage | $0 | $1,000 | $25,000 | $1,000,000 |
|---|---|---|---|---|
| Cost per User/Mo. Unlimited Trx | $1 Free <100 | $8 $4 / no ins | $40 $20 / no ins | $100 $50 / no ins |
| Documents | DL | DL | DL & Passport | DL & ePassport |
| ID-Proofing | No | Verified | Verified | In-Person |
| % of Users | 50% | 45% | 4% | 1% |
| User Credential | PIN | PIN/TouchID | Imaging DL | Token Card |

FIG. 9

SYSTEMS AND METHODS FOR DISTRIBUTION OF SELECTED AUTHENTICATION INFORMATION FOR A NETWORK OF DEVICES

CROSS-REFERENCE TO RELATED APPLICATIONS

This application is a continuation application of PCT/US2017/050783, filed on Sep. 8, 2017, which application claims the priority and benefit of U.S. Provisional Application No. 62/385,712 filed on Sep. 9, 2016, which applications are incorporated herein by reference in their entirety.

BACKGROUND OF THE INVENTION

The ubiquity of computing technology and the Internet has led to a proliferation of computing devices and web services. Identity theft and identity fraud are more common than ever, which may occur during high-value wire transfers, health records, privileged accounts and remote access to critical infrastructure. Various identity proofing and authentication methods are used with different security levels. For example, government-issued identification (IDs) may be used to help identify a person. However, not all government-issued IDs are created with equivalent security level and not all authentication methods provide equivalent security confidence. Activities, such as transactions can be limited due to uncertainty surrounding the identity of parties involved in the transaction. The inability to accurately verify a party's identity may create obstacles to successfully completing a transaction, accessing to certain property and the like, thus leading to wasted resources.

SUMMARY OF THE INVENTION

Accordingly, a need exists for systems and methods that can determine insurance level of identity to provide insurance protection on authentication. The provided systems and methods address the above issues by allowing a transaction or activity to continue with insurance protection. A method is provided to calculate the risks involved with various authentication technologies for authentication and consumer identity and access management. The method provides an accurate measurement of risks taking into account various factors associated with identity-proofing and authentication. The use of insurance protection may be incorporated into transactions and other events that require identity verification and authentication. The insurance level may be determined at granular level based on a risk profile for different identity proofing and authentication methods. Methods are provided to calculate insurance rate based on factors such as identity-proofing and distribution, NIST levels of assurance, anti-replay, authentication technologies and the like. The authentication insurance system may be used as a standalone system to provide insurance protection on on-line and remote authentications or may be used in combination with any suitable authentication and transaction systems.

In one aspect, a computer implemented method for facilitating authentication information distribution for a network of devices to be authenticated is provided. The method comprises: obtaining, at an authentication module, an identity-proofing confidence score, based at least in part on (i) an identity document confidence score which is associated with a security feature of an identity document that is used for identity-proofing, and (ii) a presentation method confidence score associated with a method used for presenting the identity document obtaining, with aid of a least one device of the network of devices, a credential authentication confidence score, wherein the credential authentication confidence score is determined based on (i) a credential confidence score associated with a credential used for authentication, and (ii) a presence of an anti-replay feature during the identity authentication; and determining an insurance level, based on the identity-proofing confidence score obtained at the authentication module and the credential authentication confidence score obtained with aid of the at least one device, wherein the insurance level is useful for generating an insurance coverage plan for the identity authentication.

In some embodiments, the security feature indicates the strength of the identity document to resist counterfeit. In some embodiments, the method used for presenting the identity document comprises knowing the identity document, showing the identity document, presenting the identity document remotely, showing the identity document in-person, or proving the identity document in-person. In some embodiments, the credential confidence score is associated with an assurance level of the credential or the likelihood of authentication error when using the credential for verifying an identity of a user. In some embodiments, the credential comprises password, visual token, physical token or biometrics of a user.

In some embodiments, the anti-replay feature comprises using nonce data to detect a replay attack. In some cases, the nonce data is generated using device state data which is about a physical state of the at least one device used during the identity authentication or using characteristic data of the credential. In some cases, the device state data comprises data collected by multiple types of sensors. In some cases, the device state data comprises positional information about the device, data indicative of environmental information collected by one or more sensors on-board the device, or local data indicative of a physical state of a component of the device, and wherein the component is selected from the group comprising a power supply unit, a processor, a sensor, and a memory. In some cases, the characteristic data of the credential comprises data generated during processing the credential by the user device or data indicating a motion when performing the identity authentication using the credential.

In some embodiments, the identity-proofing confidence score is determined further based on a location where the identity document is presented.

In some embodiments, the method further comprises supplying, by an insurance provider, the insurance coverage plan to a user and/or an entity involved in a transaction with the user, wherein the insurance coverage plan provides coverage for the user and/or the entity against a loss resulting from the identity of the counterpart in the transaction being different than the identified person, persons, or entity.

In another aspect, a system for facilitating authentication information distribution for a network of devices to be authenticated is provided. The system comprises an authentication module configured to obtain an identity-proofing confidence score, based on data about identity-proofing of a user obtained from an authentication service system, wherein the data about identity-proofing comprises a type of identity document of the user and a presentation method used for verifying the user's identity by the authentication service system; and an insurance module in communication with the authentication module, configured to generate a plurality of insurance levels for the user, wherein each of the plurality of insurance levels is generated based on the identity-proofing confidence score and a credential authentication confidence score that is (1) obtained with aid of at least one device from the network of devices, and (2) determined based on a credential to be used for a transaction and a presence of an anti-replay feature, wherein a display is configured to show a plurality of insurance coverage plans associated with the plurality of insurance levels to the user for selection, such that the authentication service system performed credential authentication according to a selected insurance coverage plan.

In some embodiments, the data about identity-proofing of a user is stored in a memory unit accessible to the authentication service system.

In some embodiments, the user is provided with one or more credentials by the authentication service system upon verification of the user's identity.

In some embodiments, the method further comprises storing data about the one or more credentials provided to the user. In some case, the credential to be used for the transaction is selected from the one or more credentials provided to the user.

In some embodiments, the anti-replay feature comprises using nonce data to detect a replay attack. In some cases, the nonce data is generated using device state data about a physical state of a device used for the credential authentication or using characteristic data of the credential. In some cases, the pre-determined relationship is stored in a memory unit accessible to the system.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2 illustrates examples of identity proofing document and associated confidence score.

FIG. 3 illustrates exemplary identity-proofing confidence scores determined by the equation.

FIG. 5 illustrates examples of user credentials and associated confidence score, in accordance with embodiments.

FIG. 6 illustrates exemplary user credential confidence scores determined by the equation.

FIG. 9 illustrates examples of insurance coverage plans associated with multiple factors of the invention, in accordance with embodiments.

DETAILED DESCRIPTION OF THE INVENTION

Figure 1:
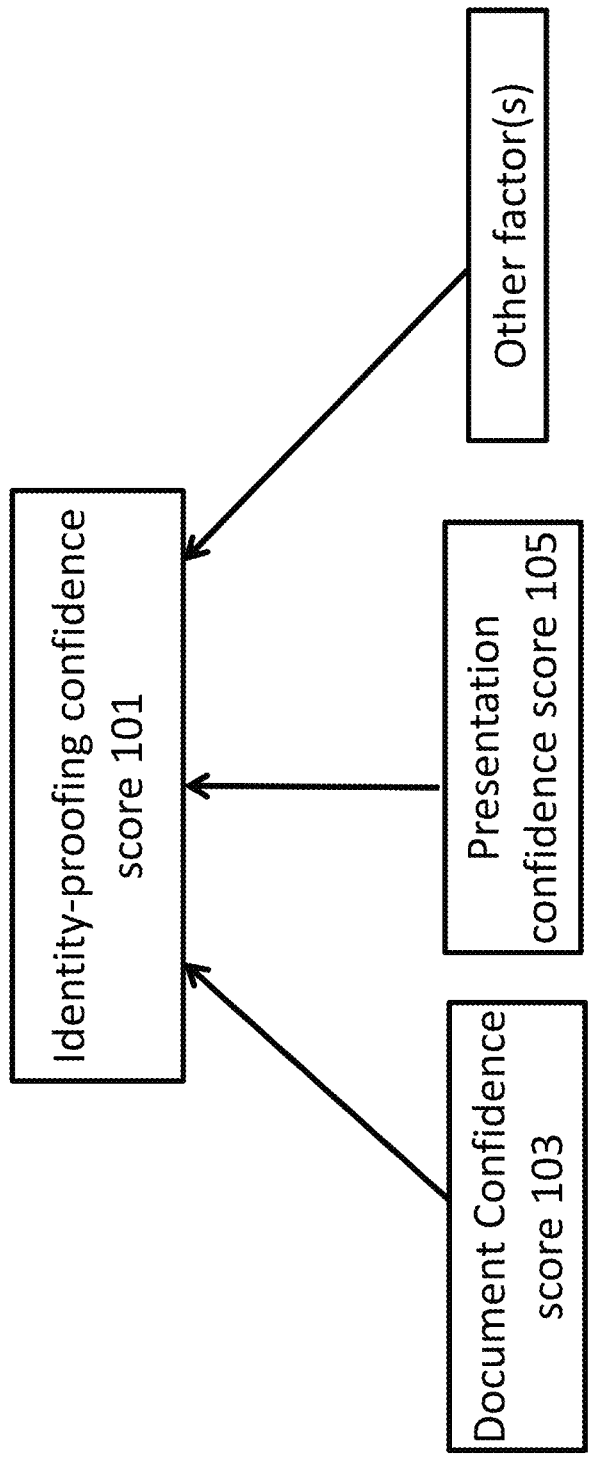
FIG. 1 illustrates exemplary factors that can be used to determine an identity proofing confidence score.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Systems and methods are provided for providing an insurance level of a user's identity. As used herein, a "user" can be any party, person, group of individuals, company, corporation, business, retail establishment, organization or any other suitable type of entity that possesses a unique identity. Such an identity can be potentially stolen or otherwise compromised, and protection against identity theft may be desired. An insurance plan and/or protection may be provided for the user based on the insurance level.

Activities, such as transactions can be limited due to uncertainty surrounding the identity of parties involved in the transaction. The inability to accurately verify a party's identity may create obstacles to successfully completing a transaction, accessing to certain property, etc, thus leading to wasted resources. For instance, an online transaction may be denied due to an authentication failure. However factors leading to the failure may not be distinguishable between a fraud identity and an inaccurate detection method used for the authentication. In another instance, an access to a building may be denied due to an authentication failure. The failure may be due to use of a non-reliable authentication method. The provided systems and methods address the above issues by allowing a transaction or activity to continue with insurance protection. The insurance protection plan may be generated based on a quantitatively measurement of the real identity of a user or a party involved in the transaction. The insurance protection plan may be generated based on an insurance level determined by various factors related to the identity of a user and the authentication method used for verifying the user. The insurance level may be determined automatically with aid of the provided system and method. The insurance level may be determined in real-time or on-demand. The insurance level may be determined by identifying a variety of factors associated an authentication method automatically or in real-time. In some cases, some factors may be detected automatically by the system and an insurance level can be calculated as a result.

The insurance protection may be used by various entities for different purposes. The insurance protection may be used by third-party entities wishing to provide a service to a user. The service may be supplied to the user with a requirement of a certain level of identity assurance. The third-party entities may comprise e-commerce systems, retail systems, financial institutions (e.g., banks, brokers, and credit card companies), merchant's systems, social networking platforms, call centers, and/or other entities which the user performs authentications with. In some instances, the third-party entity may be an online e-commerce, and the authentication of a user may be required in order to complete or deny a purchase of a product online. In some instances, the third-party entity may be a broker system, and authentication of a user may be required for verifying transfers of funds between the user's financial account and the broker system. In some instances, the third-party entity may be a social networking platform which hosts a plurality of user accounts. The identity and authentication of the user may be required for verifying user's login to the social networking platform. The third-party entity may be a provider of business information, such as, a provider of business, financial and/or quality assurance information, and/or joint venture between an insurance under-writer and a business information provider. The provided systems can be used by any party to a business transaction, such as, buyers, sellers and third parties, such as, online marketplaces.

The authentication insurance system may be used to grant access to sensitive and valuable assets. For example, access to high-value wire transfers, health records, privileged accounts, institutional banking, brokerage accounts, access to critical infrastructure (e.g., energy infrastructure, nuclear power plants) and remote or online access to mission-critical applications may be protected by the insured authentication. Remote and online transactions can be insured by the authentication insurance system according to a risk assessment of the identification of the user. In some embodiments, an insurance level can be determined based on the risk assessment of the identification of the user.

The authentication insurance level can be determined based on a confidence score or risk assessment score. The authentication insurance level may be indicative of a level of assurance in terms of identity authentication. In some cases, the authentication insurance level may indicate a confidence level in authenticating a proved identity of a user or a party. The authentication insurance level may indicate a strength of identity proofing mechanism and a strength of mechanism for authenticating the proved identity. In some cases, the confidence score or risk assessment score may be determined in real time when an authentication service is desired. Alternatively, the confidence score or risk assessment score may be pre-determined according to factors related to identity proofing processes and factors related to credential verification and authentication processes. In some embodiments, the confidence score or risk assessment score can be pre-calculated or pre-determined based on several factors defining an identity assurance level and an authentication assurance level.

The identity assurance level defines an extent to which the identity presented in an identity document or material can be trusted to actually belong to the entity represented. The identity assurance level may provide a measurable level of assurance that an identity is authentic. The identity proofing confidence score can be determined based on factors involved in an identity proofing process. The identity proofing process may be used to identify the user or establish identity of user. Identity proofing processes may occur in various situations. For example, before access is granted to an individual's taxation information stored on a government server, identity needs to be established; before funds can be withdrawn from a bank, identity is established; before a medical provider accesses a patient's electronic health record, identity is established; before a book can be checked out of the library identity is established; and, finally, before an individual starts work for an employer or enrolls in college, identity is established.

In some embodiments, the identity proofing process may take place at the time of user registration to an authentication insurance system provided by the invention. Alternatively, the identity proofing process may take place at the time of user registration to an authentication system using the invention. For example, the identity proofing process can take place electronically or in person when the user applies to the authentication system to create an account and obtain at least one credential that will allow the user to access resources or perform transactions at a service provider. The identity assurance level may indicate the strength of the identity proofing mechanism when registering a user.

The identity assurance level can be represented by an identity proofing confidence score. FIG. 1 illustrates exemplary factors may be used to determine an identity proofing confidence score 101. The identity proofing confidence score 101 may be calculated based on factors related to an identity-proofing process. In some embodiments, the factors may include document confidence factor 103, presentation confidence factor 105 and other factors.

Document confidence factor 103 may depend on by the security level of the identity documents or materials used in an identity proofing process. Document confidence factor 103 may be represented by a confidence score that is associated with a security or assurance level of the identity documents. The document confidence score 103 may indicate a maximum confidence or trust that the associated identity document can be proved to be authentic.

Different identity documents or materials may be used to uniquely identity a user. The documents may be physical documents such as a card, a paper document, or other form of credentials issued by an authority entity such as government, DMV, federal agency, etc. In some embodiments, the identity documents may be a person's civil credential such as social security card, passport, driver license, e-passport, birth certificates, employee identity cards, etc. Additionally, the identity documents used to establish identity of a user may also include records in a database, electronic identity information, etc. For example, Federal Tax ID may be used to establish identity of a company.

Different identity documents or materials may have different security levels associated with a confidence score. The security level may refer to various security features used by the identity document to prevent counterfeit or improve the capability to resist counterfeiting. The identity documents can be authenticated in a variety of ways: signal, seal, special papers and inks, high quality engraving, holograms, cryptographic techniques etc that make the identity documents recognizable and difficult to copy or forge. For example, a social security card printed on a paper with no security features may have low confidence score. A driver's license that is printed on a plastic card and has security features that are both overt and covert (e.g., ink visible only under black light, magnetic stripe) be a level higher than social security card. A passport that is printed on specialty paper and is bound in a booklet may have security features that are both overt and covert (e.g., ink visible only under black light, magnetic stripe). The special material and government printing may make a passport a level more secure than a driver's license. An E-passport that has a NFC/RFID chip embedded in it containing a person's identity information and is made in layers, which include government printing of the booklet and state department issue of the chip and its cryptographic seal, may make the E-passport a high level of security.

The document confidence score 103 may be defined as a percentage from 0% to 100%. This allows for easy understanding of the different levels as well as being flexible in allowing for detailed calculations to determine trust. In some cases, a high percentage number may correlate to a high document confidence score. A high document confidence score may be positively correlated with a likelihood that a purported individual identity is accurate. A high document confidence score may be negatively correlated to a risk of fraud. The percentage and the document confidence score can be correlated in a variety of ways, such as linearly correlated or non-linearly correlated (e.g., exponential). FIG. 2 illustrates examples of identity proofing document and associated confidence score 201. As shown in the example, a social security card with low security level features as printed on a paper with government printing may be assigned a low confidence score (e.g., 20%), a driver license as a plastic card with overt and covert security features may be assigned a higher confidence score (e.g., 40%), a passport as a special paper booklet with overt and covert security features and government printing may be assigned a score (e.g., 80%) higher than the driver license, an E-passport with NFC/RFID chip may be assigned with the highest confidence score (e.g., 100%). It should be noted that the score can be any number from 0% to 100% with 0% indicates that there is no level of security trust and 100% indicates that the identity document have security features allowing it to prove authenticity without a doubt. Any suitable format for example, numerical and graphical, continuous or discrete level, may be used to represent the score.

Multiple means may be used to determine the value of the confidence score. For example, the value may be determined based on historic data showing the probability of a particular identity document can be counterfeited or forged. The value may be determined based on the number of security features and/or the types of security features.

The identity-proofing confidence score 101 is also affected by the factor how the identity proofing document is presented and examined. Different ways an identity document is presented or examined may have different trust or confidence level. This level may be represented by the presentation confidence score 105. In some embodiments, the presentation confidence score 105 may be defined as a percentage from 0% to 100%. This allows for easy understanding of the different levels as well as being flexible in allowing for detailed calculations to determine trust or confidence.

An identity document may be presented in different ways. In some cases, different ways may be used to present identity documents of the same security level or document confidence score. In some cases, different identity documents having different confidence score may be presented by the same way. FIG. 2 illustrates examples of different ways an identity document can be presented 203. The different ways may be in-person proofing, remote proofing or online proofing, etc. In some embodiments, the different ways may be categorized to four levels including Know, Show, Present and Prove. Different levels may be associated with different difficulty levels to falsify or different levels of in-person participation of the user. For instance, the harder to falsify an identity document the higher score may be assigned. Taking a U.S. passport with NFC chip as example, at the level of 'Know', a user may prove that he is who he claims to be by showing he knows information of the passport such as the passport number. The person may present his knowledge of the passport by various means such as entering the information by typing it on a website via a user device, say the information over the phone or in person. The information provided by the person may be sufficient to establish a unique identity of the user as stated by the identity proofing document. At the level of 'Show', the user may show the passport remotely via any suitable means. For example, the user may scan the passport using a camera on a mobile or any PC device then transfer the electronic copy of the passport (e.g., captured image) including required information such as MRZ (machine readable zone) information. The transfer method may involve any suitable device such as mobile device and desktop via any suitable communication means such as on-line. The transfer method may or may not use cryptographic techniques. The user may present information that may be attainable from the identity document. Optimally, the user may present information that may only be known if the user has the identity document or one had the identity document in the user's possession. At the level of 'Present', the user may present the passport in-person to an authorized agent or authorized entity. The authorized agent or entity may have certain expertise such as the ability to recognize and verify a picture ID card and/or the capability of use a specialized infrastructure to extract the identity information. For example, an optical device may be provided to the authorized agent or entity for inspecting the passport by reading an image of the MRZ in order to extract the identity information of the user. At the level of 'Prove', the user may present the passport in-person to an authorized agent or entity. The authorized agent or entity may be equipped with specialized infrastructure or technology to prove the authentication of the identity document. For example, the authorized agent or entity may be equipped with specialized devices (e.g., MRZ reader, optical reader or scanner, magnetic reader) to inspect one or more security features of the physical identity document as described previously to identity whether the identity document is a counterfeit. In some cases, during the different presentation processes (e.g., Know, Show, Present and Prove), one or more factors associated with inspecting or authenticating the identity document may be automatically recorded. For example, when a user presents a passport in-person to an authorized agent, one or more factors (e.g., 'Prove' level, presentation location, relationship between the user and the agent, etc) related to the identity document and presentation processes may be automatically recorded in a database accessible by the system. In some cases, a device may be used to authenticate or inspect an identity document and the device may transmit wired or wireless communication the identity information captured or identified by the device to one or more processors for analysis. The device may be an optical device, a scanner, a magnetic stripe reader, etc. Data transmission can be realized by any feasible means such as wired or wireless communication. When the identity information is analyzed and the identity is authenticated, a plurality of factors such as the presentation location, presentation method, and identity document type may also be recorded and stored in a database.

In some embodiments, the four levels or categories of methods used to present an identity document may be associated with a presentation confidence score. The presentation confidence score may indicate the extent to which the identity presented in an identity document or material can be trusted to actually belong to the entity represented in terms of the delivery or presentation method used. The identity assurance level may provide a measurable level of assurance that a presentation method is capable to authenticate the identity. The presentation confidence score 105 may be defined as a percentage from 0% to 100%. This allows for easy understanding of the different levels as well as being flexible in allowing for detailed calculations to determine trust.

In some cases, high percentage number may correlate to a high presentation confidence score. A high presentation confidence score may be positively correlated with a likelihood that a presented identity is accurate. A high presentation confidence score may be negatively correlated to a risk of fraud. The percentage and the presentation confidence score can be correlated in a variety of ways, such as linearly correlated or non-linearly correlated (e.g., exponential). FIG. 2 illustrates examples of ID material presentation levels and associated confidence score 203, in accordance with embodiments of the invention. As shown in the example, presentation method at a 'Know' level may only require users show that they know certain information of their identity documents (e.g., expiration date, passport ID, driver license number, social security number, etc) and the 'Know' level may be assigned a low confidence score (e.g., 20%). Methods categorized in a 'Show' level may require users to provide a copy of the identity documents remotely such as send a scanned image of the identity document via network, and the 'Show' level may be assigned a score higher than the 'Know' level (e.g., 40%). Methods categorized in a 'Present' level may require users to present the identity documents in-person to an authorized agent such that the authorized entity can extract the identity of the user from the ID document in-person. The 'Present' level may be assigned as core (e.g., 80%) higher than the 'Show' level. Methods categorized in a 'Prove' level may require users present their identity documents to an authorized agent in-person and identity documents may be verified and authenticated by the authorized agent. The 'Prove' level may be assigned with the highest confidence score (e.g., 100%). Any number of levels may be included for categorization of identity proofing methods.

It should be noted that the score can be any number from 0% to 100% with 0% indicates that there is no level of security trust the way the identity document is presented and 100% indicates that the identity document can be proved authenticity without a doubt. In some embodiments, different methods in the same category or at the same level may be assigned the same confidence score. In other embodiments, different methods for identity-proofing may be associated with different scores. For example, methods categorized into the 'Know' level may be assigned any score in the range 20%-40%, methods categorized into the 'Show' level may be assigned any score in the range 40%-60%, methods categorized into the 'Present' level may be assigned any score in the range 60%-80%, methods categorized into the 'Prove' level may be assigned any score in the range 80%-100%. Any suitable format for example, numerical and graphical, may be used to represent the score.

Identity-proofing confidence may be presented by a confidence score 101. In some embodiments, the confidence score 101 may be determined based on factors such as document confidence and presentation confidence, etc. The confidence score may be calculated based on a product and/or addition of a document confidence score and presentation confidence score. an increase in a document confidence score and/or presentation confidence score may result in an increase of the identity proofing confidence score. One or more of the document confidence and/or presentation confidence may be determined based on a physical identity document for a user, which may be presented in its physical form, or a visible rendering of the physical identity document may be formed. FIG. 2 shows an exemplary equation the identity-proofing confidence score can be calculated 205. The present system and methods may calculate the identity-proofing confidence score using a formula such as, but not limited to:

$$\text{Identity-proofing confidence \%} = \text{document confidence \%} * \text{presentation confidence \%}$$

Any number of additional features or factors can be included in the equation. The other factors may be included in the equation by various operations such as addition or multiplication. The equation can of course be altered and/or extended to include any number of features such as:

$$\text{Identity-proofing confidence \%} = \text{document confidence \%} * \text{presentation confidence \%} * \text{other factors \%}$$

In the example above, the identity-proofing confidence may be the same as the identity-proofing confidence score 101, the document confidence may be the same as the document confidence score 103 and the presentation confidence may be the same as the presentation confidence score 105. Other formula or equation may be employed to calculate the identity-proofing confidence score. For example, the identity-proofing confidence score can be calculated or determined as a weighted sum of the various factors. The weight coefficients may be indicative of significance of the associated factor. The weight coefficients may be determined empirically such as based on historic data. the weight coefficients may be determined based on any suitable theory or any purposes. The weight coefficients may or may not be equivalent. In this case, the formula used to calculate the identity-proofing confidence score may be represented as:

$$\text{Identity-proofing confidence \%} = P1 * \text{document confidence \%} + P2 * \text{presentation confidence \% where } P1 \text{ and } P2 \text{ are weighting coefficients.}$$

In some embodiments, one identity document is included to calculate the authentication insurance score using the equations as described previously. In other embodiments, multiple identity documents may be used for identity-proofing. For example, a user may provide his or her driver's license as well as social security card. In this case, multiple identity-proofing confidence score may be calculated then summed up to generate a total identity-proofing confidence score. In some cases, use of more identity documents may increase the identity-proofing confidence score. For example, a use of both a passport and driver's license may be associated with a higher identity-proofing confidence score than a use of a passport alone.

Additional factors can be included in the equation to be used to evaluate the identity-proofing confidence score 101. The additional factors may be factors that are related to an identity-proofing process. For instance, the factor can be where the identity proofing takes place, and different places such as office, user's home, park, etc may be associated with different confidence score. The factor can be a record or history of the identity documents issued, or frequency of the documents being used. Other factors may also include the experience or expertise of an agent such as a public notary inspecting the documents (e.g. the capability the public notary is trained to look for forged documents such as using), the relationship of the user to the public notary such as never met before, employer/employee, friend since childhood, etc. These additional factors can be included in the equation in a variety of ways, such as weighted sum or a multiplication factor.

FIG. 3 illustrates exemplary identity-proofing confidence score determined by the equation 205. As shown in the examples, identity-proofing confidence score may be low if during the identity-proofing process, a user uses his social security card the identity-proofing document and present the document by showing he know the social security card number over the phone or via network. The identity-proofing confidence score may be calculated as the product of the low document confidence score (e.g., social security card 20%) and the low presentation confidence score (e.g., know 20%) as shown in the first entry of the table. In another example, identity-proofing confidence score may be high if during the identity-proofing process, a user presented his E-passport which embedded with a NFC/RFID chip in-person to an authorized agent and the E-passport is verified by the agent. In this case the identity-proofing confidence score can be calculated as a product of the high document confidence score 100% and the high presentation confidence score 100%. As mentioned previously, other factors may be included to determine the identity-proofing confidence score. For example, the location where the identity-proofing document is presented may be considered as shown in the last two entries of the table. Different locations may result in different location confidence score (e.g., office 40%, home 20%).

An insurance level can be determined by a confidence score or risk assessment score based on factors defining an identity assurance level and an authentication assurance level. The identity assurance level is represented by the identity identity-proofing confidence score. The authentication assurance level can be represented by a user credential confidence score.

The user credential confidence score can be determined based on factors involved in an authentication process. After a user has established his identity or registered with an authentication system as described previously, the user may be provided with one or more credentials. The one or more credentials may be used for authentication later. The authentication process may be used to verify the user is the claimed registered user. In some embodiments, the authentication process may take place after a user registration to an authentication system using the provided systems and methods. In some embodiments, the authentication process may take place remotely such as online. Optionally, the authentication process may also take place locally (e.g., in person). While an identity assurance level is directed to a user identity authentication at registration, an authentication assurance level is directed to a user identity authentication using user credentials after registration.

The authentication assurance level may indicate authentication strength. The authentication strength may be the strength of the method by which a user can prove he is the claimed registered user. The identity assurance level may provide a measurable level of assurance that method of authenticate the user using the credential can be trusted. The authentication assurance level may indicate the likelihood of authentication error due to the method used for authentication.

Figure 4:
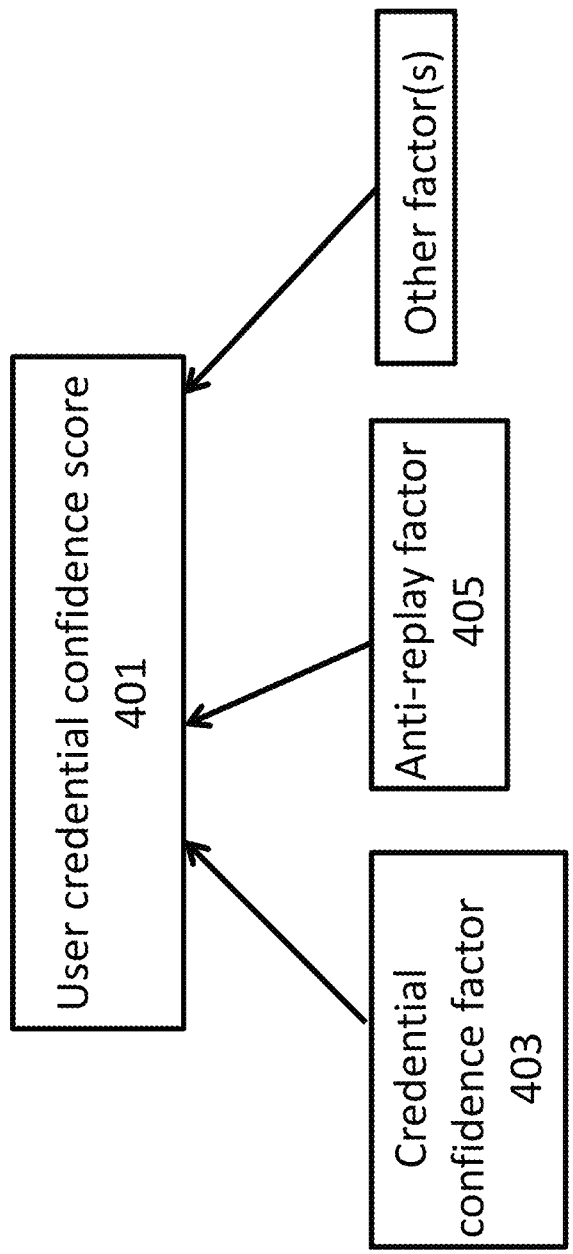
FIG. 4 illustrates exemplary factors may be used to determine a user credential confidence score.

The authentication assurance level can be represented by a user credential confidence score. The user credential confidence score may be determined based on factors related to the authentication process. FIG. 4 illustrates exemplary factors may be used to determine a user credential confidence score 401. In some embodiments, the factors may include credential confidence factor 403, anti-replay present factor 405 and other factors.

The credential confidence factor 403 may be defined by the strength of the credentials used for an authentication. The credential confidence factor 403 may be represented by a confidence score that is associated with an assurance level of the user credential. The credential confidence score 403 may indicate the ability to know with confidence that this is the user on the other end of a transaction by verifying the credential provided by the user. The credential confidence score 403 may indicate the likelihood of authentication error using the associated credential.

Different credentials may be used to authenticate a user. The credentials may or may not contain an identity of the user. Optionally the credentials may or may not contain attributes to the identity of the user. For example, the credential may contain verified name of the real user or pseudonyms. The credentials can be any form. The credentials may be a visual token, a physical token, something known by the user or biometrics of the user. The credentials may be physical object such as a physical token that can be possessed and controlled by a user (e.g., paper credential, card, finger print reader, card reader, etc). The credentials may be electronic such as digital document that can be stored as data. The credentials can be secret information that the user knows such as user name and password. The same credentials may be used repeatedly for different authentication processes. Different credentials may be used for different authentication processes. The credentials may be generated later as needed such as QR code.

The user credentials may be associated with a credential score 403. FIG. 5 illustrates examples of user credentials and associated confidence score 501, in accordance with embodiments. The maximum confidence scores for each credential as shown in the examples may be: username and password 20%, a card with a printed QR code 40%, a one-time passcode (OTP) that changes passcode for a period of time 80%, a biometric reader 100%.

It should be noted that the score can be any number from 0% to 100% with 0% indicates that there is no level of security trust the credential is authenticated and 100% indicates that the credentials can be proved authenticity without a doubt. In other embodiments, different methods for identity-proofing may be associated with different scores. In some cases, the difficulty levels to falsify may be associated with different scores. For instance, the harder to falsify a use of credentials the higher score may be assigned. For example, a finger print biometric reader may be assigned a lower score than an iris biometric reader, or a challenge-response method may be assigned with a higher score than user-password method. Any suitable format for example, numerical and graphical, may be used to represent the score.

The user credential confidence may be determined based on an anti-replay present factor 405 in additional to the credential confidence factor. Any set of user credentials may allow an attacker to replay them and masquerade as the user. Replay, or replay detection, is therefore another critical factor in determination of the user credential confidence score. In some embodiments, presence of anti-replay 405 feature may be indicated by an anti-replay score. FIG. 5 shows examples of anti-replay present scores 503. Presence of anti-replay protection may be assigned a higher score than absence of anti-replay protection. Alternatively, different scores may be associated with different strength of anti-replay protection. For instance, a method used to detect replay attack with higher successful rate may be associated with a higher score.

Various methods may be used to provide anti-replay feature. For example, nonce data relating to a device used to provide user credentials may be captured and used as anti-replay protection. The nonce data can be related to various factors, such as the device used for authentication or credential delivery, and the credential itself, etc. The nonce data may change with respect to time, geo location, motion, device status and any environmental factors. Ideally the nonce data should not be repeated that is a singularity. Having exactly the same nonce data may indicate a replay attack. The anti-replay feature can be generated at any time. For example, the anti-replay protection may be generated at the time a credential is provided by the user before transferring it to an authentication system.

The nonce data may be generated based on data associated with a device state or authentication state. In an example, data about the device state may be collected by one or more sensors disposed on the device used for authentication. Alternatively, the one or more sensors may not be onboard the device. For example, the one or more sensors may be located on another device in communication with the device. The data about the device state may comprise motion, speed, orientation, or location of device during authentication. The data about the device state may comprise data associated with a state of a component of the device. For instance, a state of one or more components of a device may include a state of a display of a device (e.g., an image or data shown on a display of a device, such as a screenshot), a level of the power supply (e.g., state of charge, percentage of charge remaining), usage of a device (e.g., software applications that are on and running), a time indicated by a clock of the device, the amount of the memory storage used by the device (e.g., number of bytes or percentage of memory used), a processing level of the device, operational states of one or more sensors of the device, a temperature of the device or any component of the device, or a barometric pressure of the device. A state of the device may also include environmental information collected by the device. For instance, the device may include a camera that may take a snapshot of the environment around the device. The environmental information collected by the device may include an image of an environment within a field of view of a camera of the device. The environmental information may include audio information collected by a microphone of the device. The environmental information may include information collected by a motion detector, an ultrasonic sensor, lidar, temperature sensor, pressure sensor, or any other type of sensor that may collect environmental information about the device. The environmental information may include detecting the touch or hand position of a user holding the device, and collecting which portions of the device or touched or held by the user.

The nonce data may be generated based on data associated with an authentication state. The data associated with an authentication state may comprise data indicating performance of an authentication. For example, when the credential is a magnetic card token, the nonce data may be generated using magnetic fingerprint data, and/or swipe characteristics (e.g., speed, orientation, or location of the swipe). Such data may or may not be collected by one or more sensors. In some cases, these data may be collected by one or more sensors onboard the user device. Alternatively, these data may be collected by one or more sensors on a token device such as a card reader. In another example, when the authentication is performed by scanning a user ID document such as a driver's license, nonce data may be generated using data collected during the scanning, such as an operational state of the camera (e.g., zoom factor, exposure time, etc) or metadata of the image captured by the camera.

User credential confidence may be presented by a confidence score 401. In some embodiments, the confidence score 401 may be determined based on factors such as credential confidence and anti-replay presence, etc. FIG. 5 shows an exemplary equation the identity-proofing confidence score can be calculated 505. The present system and methods may calculate the user credential confidence score using a formula such as, but not limited to:

User credential confidence %=credential confidence %*anti-replay present %

The equation can of course be altered and/or extended to include any number of factors:

User credential confidence %=credential confidence %*anti-replay present %*other factors %

In the example above, the user credential confidence may be the same as the user credential confidence score 401, the anti-replay present may be the same as the anti-replay present factor 405 and the credential confidence may be the same as the credential confidence factor 403. Other formula or equation may be employed to calculate the user credential confidence score. For example, the user credential confidence score can be calculated or determined as a weighted sum of the various factors. In this case, the formula used to calculate the user credential confidence score may be represented as:

user credential confidence %=$P1$*credential confidence %+$P2$*anti-replay present % Where $P1$ and $P2$ are weighting coefficients.

Additional factors can be included in the equation to be used to evaluate the user credential confidence score 401. The additional factors may be factors that are related to the credential authentication process. For example, the additional factors may include the authentication protocols used in the authentication process and various other features may be employed to prevent threats such as eavesdropper, on-line guessing, verifier impersonation and man-in-the-middle attacks, etc.

FIG. 6 illustrates exemplary user credential confidence score determined by the equation 505. As shown in the examples, the user credential confidence score may be low if during the authentication process, a user uses user name/password as credential without anti-replay protection. The user credential confidence score may be calculated as the product of the low credential confidence score (e.g., user name/password 20%) and the anti-replay present score (e.g., no anti-replay 20%) as shown in the first entry of the table. In another example, the user credential confidence score may be high if during the authentication process, the user verified his identity using a biometric reader with anti-replay protection. In this case the user credential confidence score can be calculated as a product of the high credential score.

The identity-proofing confidence score and user credential confidence score as described previously can be used to generate an authentication insurance score. The authentication insurance score may represent an authentication insurance level or a risk assessment level. In some embodiments, the authentication insurance score can be pre-calculated or pre-determined based on several factors defining an identity assurance level (e.g., identity-proofing confidence score) and an authentication assurance level (e.g., user credential confidence score).

The systems and methods may calculate the authentication insurance score based on a correlation relationship between the authentication insurance score, identity-proofing confidence score and the user credential confidence score. A variety of formulas can be used to represent such relationship such that when the identity-proofing confidence score or the user credential confidence score increases, the authentication insurance score increases. The systems and methods may calculate the authentication insurance score using a formula such as, but not limited to:

Authentication insurance score=identity-proofing confidence %*user credential confidence %

The equation can of course be altered and/or extended to include any number of other factors:

Authentication insurance score=identity-proofing confidence %*user credential confidence %*other factors %

In an example, four users are identity proofed with an e-passport to the level of 'Prove' by validating the NFC chip. To this point, the four users may have an identity-proofing confidence score of 100%. User 1 may receive a username/password as his or her credential with anti-replay. User 2 may receive a card with a printed QR code to scan each time they authenticate with anti-replay. User 3 may receive a one-time passcode token that changes passcodes every minute with anti-replay. User 4 may receive a biometric fingerprint reader with anti-replay. The respective authentication insurance score may be calculated according to the equation as 20% for user 1, 40% for user 2, 80% for user 3 and 100% for user 4.

In some embodiments, only one identity-proofing document is required for identity proofing and only one user credential is required for authentication. In this case, the equation as described previously may be used to generate an authentication insurance score. In some embodiments, any number of identity-proofing documents and any number of credentials may be considered to generate an authentication insurance score. A number of equations can be used to generate the authentication insurance score such as weighted sum. The additional identity proofing documents and user credentials may or may not increase the authentication insurance score. In some cases, the additional documents and credentials with non-zero confidence may increase the authentication insurance score.

Figure 7:
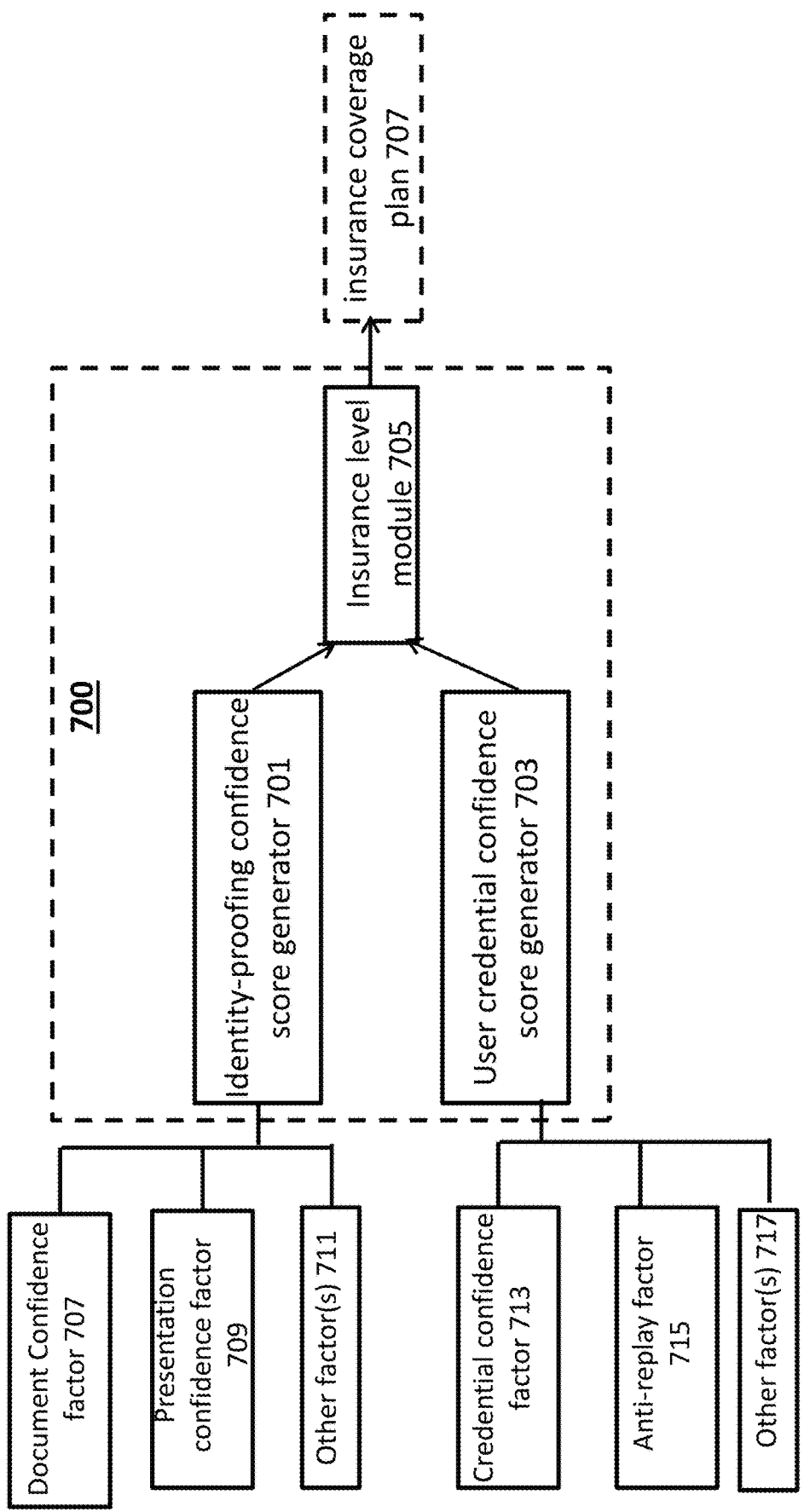
FIG. 7 is a schematic authentication insurance system configured to determine an insurance level, in accordance with embodiments of the invention.

The authentication insurance score can be used to determine an insurance level. FIG. 7 is a schematic authentication insurance system 700 configured to determine an insurance level, in accordance with embodiments of the invention. In some cases, the insurance level may be determined automatically. The insurance level can be further used to determine an insurance premium or insurance coverage plan. The insurance level can be used by an insurance entity or any third party entity to provide authentication insurance protection.

The insurance protection may be used by various entities for different purposes. The insurance protection may be used to, for example, permit transactions or gain access to resources or assets. The insurance level can be used for various activities which may or may not include the exchange of money, good, services, and/or information. The activities may include any situation where authentication service is required. The insurance protection may be used by third-party entities wishing to provide a service to a user. The service may be supplied to the user with requirement of certain level of identity assurance. The third-party entities may comprise e-commerce systems, retail systems, financial institutions (e.g., banks, brokers, and credit card companies), merchant's systems, social networking platforms, call center, and/or other entities which the user performs authentications with. In some instances, the third-party entity may be an online e-commerce, and the authentication of a user may be required in order to complete or deny a purchase of a product online. In some instances, the third-party entity may be a broker system, and authentication of a user may be required for verifying transfers of funds between the user's financial account and the broker system. In some instance, the third-party entity may be a social networking platform which hosts a plurality of user accounts. The identity and authentication of the user may be required for verifying user's login to the social networking platform. The third-party entity may be a provider of business information, such as, a provider of business, financial and/or quality assurance information, and/or joint venture between an insurance under-writer and a business information provider. The instant invention can be used by any party to a business transaction, such as, buyers, sellers and third parties, such as, online marketplaces.

The authentication insurance system may be used to grant access to sensitive and valuable assets. For example, access to high-value wire transfers, health records, privileged accounts, institutional banking, brokerage accounts, access to critical infrastructure (e.g., energy infrastructure, nuclear power plants) and remote or online access to mission-critical applications may be protected by the insured authentication. Remote and online transactions can be insured by the authentication insurance system according to a risk assessment of the identification of the user.

The authentication insurance system 700 may include multiple modules. In some embodiments, the authentication insurance system 700 may include an identity-proofing confidence score generator 701, a user credential confidence score generator 703 and an insurance level module 705. In some instances, the authentication insurance system 700 may also comprise other modules to generate confidence score relating to other factors.

The authentication insurance service system 700 may comprise memory storage units which may comprise non-transitory computer readable medium comprising code, logic, or instructions for performing one or more steps. The one or more processors of the authentication insurance system 700 may be capable of executing one or more steps, for instance in accordance with the non-transitory computer readable media. In some embodiments, the one or more processors may generate or receive requests for generating insurance levels, processing the requests, identifying information needed for the authentications, returning the insurance level result in response to the requests. The authentication insurance service system may be coupled to one or more databases. The one or more databases may store various information, including but not limited to, various factors and the associated confidence scores as described previously, equations to calculate an insurance level, recommended insurance coverage plan, etc. In example, an insurance level may be generated based on a plurality of factors. The plurality of factors may be automatically detected by the system or by one or more devices coupled to the system and stored in a database. The plurality of factors may be used to calculate the insurance level using a formula provided elsewhere herein. The insurance level may be further used to determine an insurance plan associated with a transaction. In some cases, the insurance level may be compared against a threshold to determine whether the insurance level is qualified for any available insurance plan. For instance, the threshold may be determined such that when the insurance level is below the threshold, it may indicate a high-risk identity authentication thus no available insurance plan can be provided. Alternatively, all the insurance level may be associated with an insurance plan.

In some embodiments, the identity-proofing confidence score generator 701 can be used to determine an identity-proofing confidence score. The confidence score may be generated based on multiple factors such as document confidence factor 707, presentation confidence factor 709 and various other factors 711. The identity-proofing confidence score may be generated using the method as described in FIG. 1.

In some embodiments, the user credential confidence score generator 703 may be used to determine a user credential confidence score. The confidence score may be generated based on multiple factors such as credential confidence factor 713, anti-replay factor 715 and various other factors 717. The user credential confidence score may be generated using the method as described in FIG. 4.

In some embodiments, the insurance level module 705 can be configured to determine an insurance level. The insurance level can be represented by an authentication insurance score as describe previously. The authentication insurance level can be determined based on the identity-proofing confidence generated by the identity-proofing confidence score generator 701 and the user credential confidence generated by the user credential confidence score generator 703.

The insurance level may indicate the extent to which the identity of a user can be trusted. The insurance level may provide a measurable level of assurance that an identity can be authenticated accurately. In some cases, different insurance levels may be indicative of different levels of strength to resist authentication attacks or the capabilities to successfully detect an authentication attack. For example, a low insurance level may indicate a high rate of error or authentication failure due to the inherent technologies used or ability to resist authentication attacks. In one example, if an authentication is passed, however a low insurance level may indicate there is a greater possibility that problem may occur for this transaction, such as a failure detection of fraud.

In some instances, the insurance level determined by the insurance level module 705 may be defined as a percentage from 0% to 100%. The insurance level can be represented in numerical, graphical, levels, categories, or various other formats. In some cases, the insurance level can be pre-calculated and stored in a database. The insurance level can be stored in a pre-computed database that relates attributes of the multiple factors to the insurance level. For instance, an entity (e.g., insurance entity) may use the user's identity document type and presentation method, credentials used for authentication, anti-replay presence to index into the database to retrieve the associated insurance level. In other cases, the insurance level may be calculated dynamically as needed.

The authentication insurance system 700 can be used for a broader range of systems to participate in various types of activities as described elsewhere herein. In some embodiments, the insurance level provided by the insurance level module 705 can be used by one or more entities (e.g., insurance entity) to determine an insurance premium or insurance coverage plan 707. The one or more insurance entities may provide insurance service(s) to a user, a transaction, any other parties participated in an activity required the authentication. For example, for a transaction between a user and a service provider, a premium may be charged by an insurance entity in exchange for covering a risk of loss associated with the user's identity authentication during the transaction. The premium can be determined based on the authentication insurance level provided by the invention. In one example, if the identity authentication passed and services have been offered by the service provider. However a problem occurs for this transaction, such as a failure of detecting a fraud. The service provider may pursue damage recovery from the insurance entity, e.g., request for certain amount of payment from the insurance entity.

Figure 8:
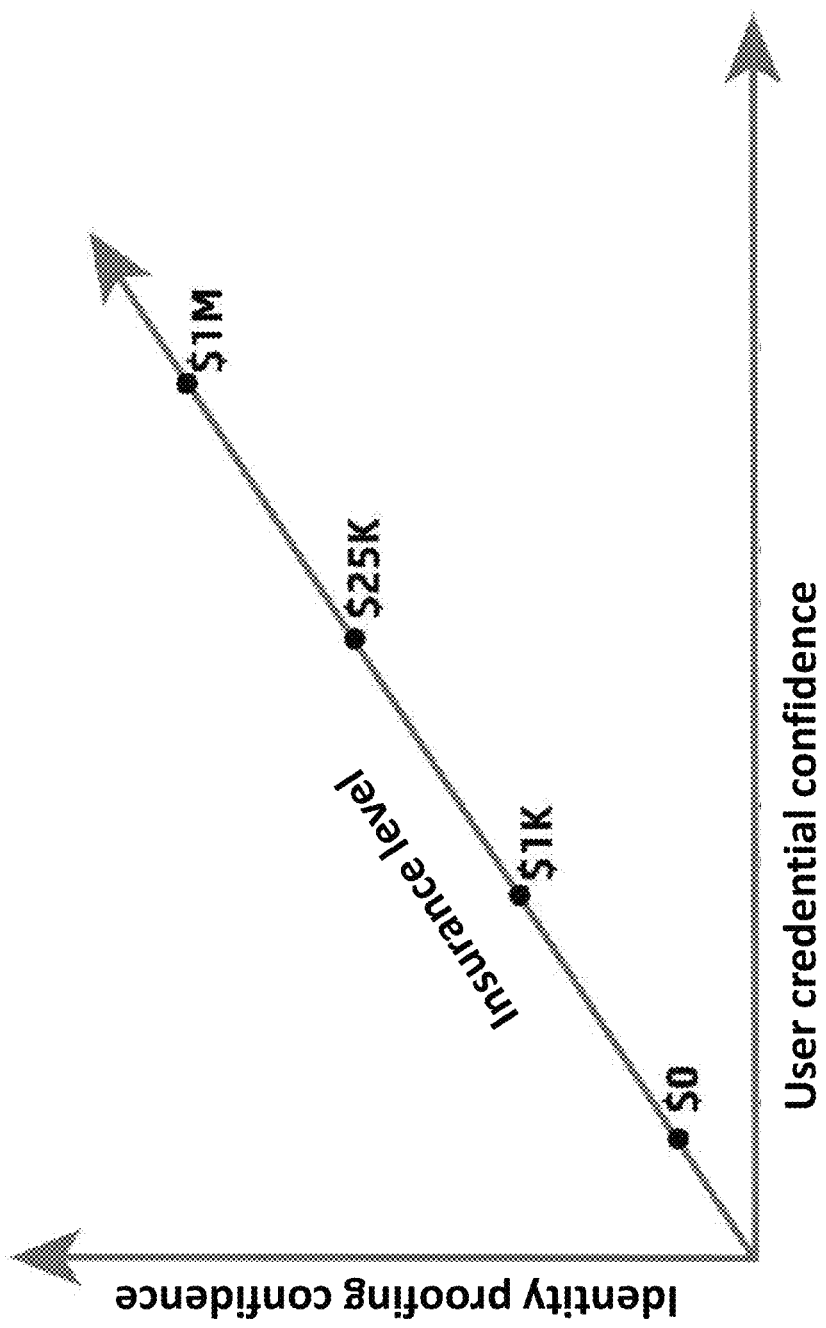
FIG. 8 illustrates an exemplary relationship between the insurance level and the confidence scores.

The insurance level may be further processed by an insurance entity to determine an insurance premium or coverage plan. FIG. 8 illustrates an exemplary relationship between the insurance level and the confidence scores. The insurance level can be determined using methods as described elsewhere herein. For illustration purpose, the insurance level is demonstrated as a function of user credential confidence and identity proofing confidence. It should be noted that other factors as described previously can be included as variables to determine the insurance level. As shown in the figure, the higher insurance level may be associated with a higher insurance coverage. In some cases, the insurance level may automatically determine an insurance plan. The insurance level or insurance score may be provided to an insurance entity to generate an insurance plan. For example, different insurance levels may be associated with different coverage value, such as higher insurance score is associated with higher coverage value or lower premium. In some instances, additional factors may be included to determine an insurance plan. In some cases, an insurance level is required to be above certain threshold to determine an insurance plan. When the insurance level is below the threshold, it may be indicative of a high-risk identity authentication that no insurance plan would be available.

An insurance entity may include additional factors to determine an insurance premium or coverage plan. The premium charged by the insurance entity may be a fixed fee for each authentication event. Alternatively, the premium charged by the insurance entity may be a predetermined percentage of the transaction amount. Alternatively, the premium may be a monthly, semi-annual, or annual payment to insure authentications for transactions or other activities, within the corresponding period. The insurance premium or coverage value may or may not be adjusted according to the actual number of users using a particular type of user credential. The insurance entity may charge an authentication service system for the insurance service. The third-party entity such as a service provider may pay the authentication service system to cover the cost for authentication performances and/or the insurance services.

FIG. 9 illustrates an example of insurance coverage plans associated with multiple factors of the invention, in accordance with embodiments. The insurance carrier coverage may be transaction/use based pricing, fixed monthly/yearly pricing, etc. A low insurance coverage price may be provided when the identity proofing confidence (e.g., driver license without verification) and the user credential confidence are low (e.g., username/password). A high insurance coverage price may be provided when the identity proofing confidence (e.g., driver license and E-passport verified in-person) and the user credential confidence are high (e.g., a card reader that can authenticate a token based on biometric data and token fingerprint). In some cases, an insurance level or insurance score may be associated with a ratio of the coverage price and a premium. For example, higher insurance score may be associated with a higher ratio. With a higher insurance score, a party protected by the insurance plan may be allowed to get a higher coverage price than the coverage price associated with a lower insurance score for the same amount of premium. In some cases, multiple options may be provided to a user or any party under the insurance protection once an insurance score is determined. A premium value can be selected based on a desired security level.

Figure 10:
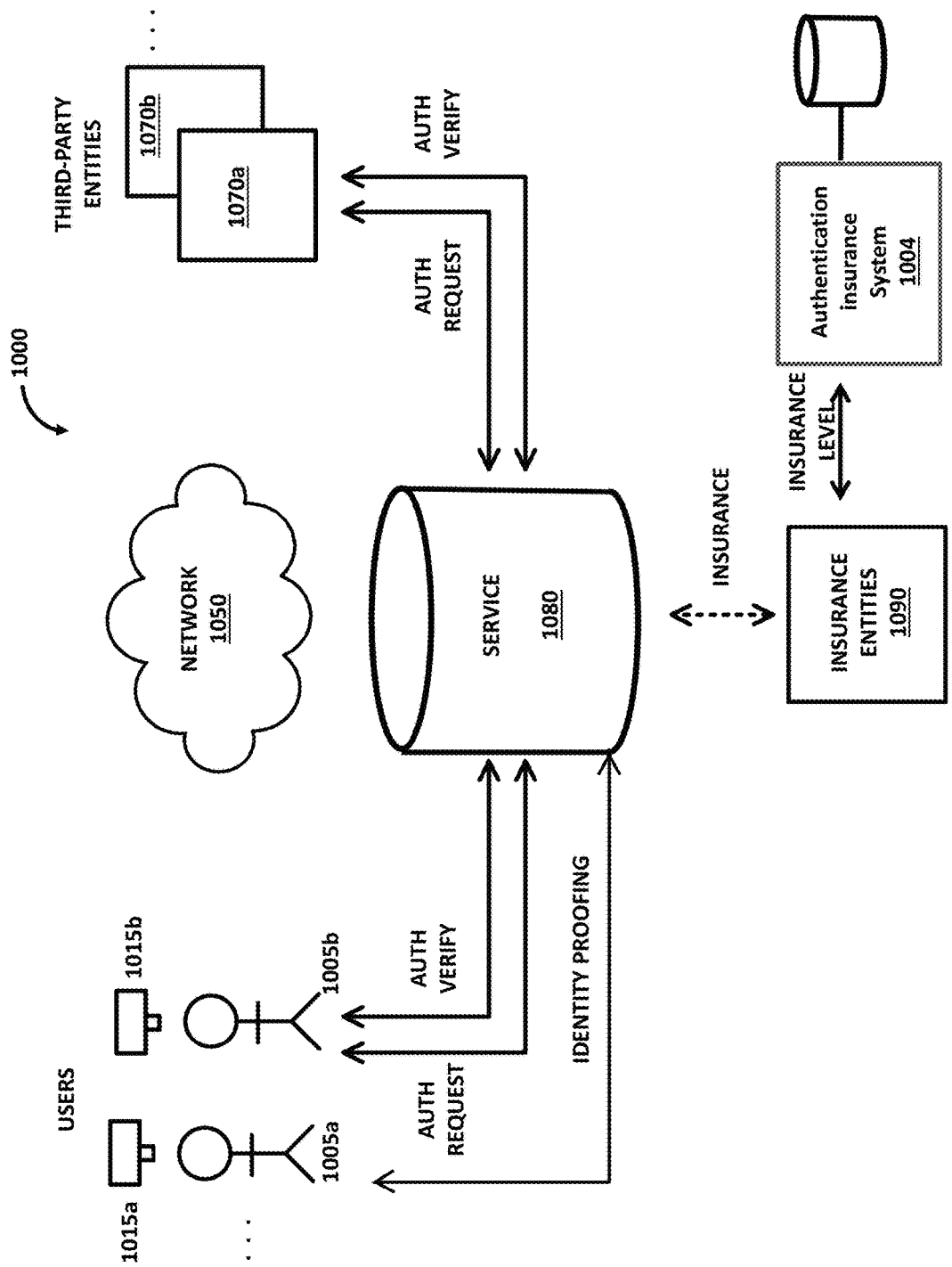
FIG. 10 shows a schematic system illustrating various identity proofing, authentications, and insurance services, in accordance with embodiments of the invention.

FIG. 10 shows a schematic system 1000 illustrating various identity proofing, authentications, and insurance services, in accordance with embodiments of the invention. Insurance level provided by the present invention may be used to determine various insurance services. The insurance services may be used to protect various activities requiring identity authentication. The activities may or may not include the exchange of money, good, services, and/or information. The system 1000 may include one or more authentication service 1080 (e.g., a server system configured to provide a variety of authentication services including the credentials covered by the insurance plan), one or more third-party entities 1070a, 1070b (e.g., a merchant's system, a broker's system, a social networking platform, or other entity requiring authentication of a user), one or more users 1005a, 1005b, one or more credential associated with each user 1015a, 1015b, one or more insurance entities 1090, an authentication insurance system 1004 and communication network(s) 1050 for providing communications between these components. In some instances, the system 1000 may also comprise one or more user devices (not shown) in communication with respective credentials. In some instances, a user device may be a user credential.

The communication network(s) may include local area networks (LAN) or wide area networks (WAN), such as the Internet. The communication network(s) may comprise telecommunication network(s) including transmitters, receivers, and various communication channels (e.g., routers) for routing messages in-between. The communication network(s) may be implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), WiMAX, or any other suitable communication protocols.

In some embodiments, the users 1005a, 1005b may prove their identity to the service 1080 when they register to the service system 1008. The service system 1080 may perform identity proofing of the user by requiring identity proofing document via certain presentation means. The identity proofing document and the presentation method may correspond to a respective confidence score that can be used to determine an identity-proofing confidence score as described elsewhere. Various other factors and more than one identity proofing documents may be used for identity proofing. Once the identity of the user is proved, the service 1080 may issue one or more credentials 1015a, 1015b to the users. The credentials can be used for later authentications.

The service system 1080 may include authorized agent who is capable to authenticate identity proofing document in-person or remotely. The service system 1080 may also include or have access to one or more databases for storing various information obtained during user registration process and features engaged in an authentication processes. The various information may include but not limited to, user identity information, identity proofing document information, authentication or presentation methods, user provided information associated with their account (e.g., challenge questions, username, password), information regarding credentials issued to the user such as pre-registered card information (e.g., encoded data, magnetic fingerprint data, and/or swipe characteristics) of one or more cards of the user associated with a card reader, pre-registered account information of the user associated with the card reader, pre-registered device information of the user device(s) which may have interactions with the card reader, pre-registered device identifier of the card reader, historic authentication reads data using the card reader, registration data registered using the card reader, and various other factors collected during the identity proofing process (e.g., location, time, public notary) and various features of the credentials. The databases may also store information regarding various features of the later authentication processes. These factors may be related to a user credential confidence score such as the credential to be authenticated, presence of anti-replay features and any other factors as described elsewhere herein.

The authentication service 1080 may be configured to perform various authentications as required by various activities as discussed elsewhere herein. The various authentications may include verifying user credentials with or without anti-replay features. The credentials and presence of anti-replay features can be associated with a user credential confidence score. The various functionalities of the authentication service may be facilitated by use of one or more processors. The authentication service may be facilitated by and/or have access to one or more databases. The authentication service may be implemented on one or more stand-alone data processing apparatuses. Alternatively, the authentication service may be implemented on one or more processing apparatuses and/or databases offered by a distributed network of computers (e.g., peer-to-peer or cloud-computing based infrastructure). One or more functionalities of the authentication service may be part of a server or accessed by a server.

The authentication service may be in communication with one or more user devices and/or one or more user credentials 1015a, 1015b. The authentication service may be in communication with various user devices and/or user credentials 1015a, 1015b with aid of a communication unit (e.g., an I/O interface). The authentication service may be in communication with various external server systems (e.g., merchant's system, broker's system, credit card companies, social network platforms, and/or other entities). The authentication service may be in communication with various external server systems with aid of one or more I/O interfaces. The I/O interface to the user devices and/or the user credentials 1015a, 1015b may facilitate the processing of input and output associated with the user devices and/or the card readers respectively. For example, the I/O interface may facilitate the processing of a user input associated with a request for secure authentication. The I/O interface to external server systems may facilitate communications with one or more third-party entities (e.g., merchant's system, broker's system, credit card companies, social network platforms, and/or other third-party entities).

In some instances, the insurance entity 1090 may be in communication with the authentication service 1080. The insurance entity 1090 may provide insurance coverage plans to the authentication service 1080 then the authentication service may provide insured authentication to the users and other entities engaged in the various activities. In some instances, the insurance entity 1090 may be in communication with the third-party entities 1070a, 1070b (e.g., service provider). For example, the insurance entity 1090 may provide insurance coverage plans to the service provider for selection. The service provider may choose an insurance coverage plan and require the authentication system 1080 to perform authentications stick to the insurance plan (e.g., authenticate user credentials in the way as covered by the insurance plan). The service provider may select the insurance coverage plan based on the activities associated with the users. For example, the service provider may select the insurance coverage plan according to the amount of money in a transaction. In another example, the service provider may select the insurance coverage plan according to the available credentials accessible to the users, the availability of identity proofing documents, locations and various factors to the users. In some instances, the insurance entity 1090 may be in communication with the users 1015a, 1015b. For example, the users may wish to authenticate the third-party entities engaged in the transaction in which case the insurance entity 1090 may provide the insurance coverage plan to the users in order to protect the authentication of the third-party entities. It should be noted the insurance coverage plan can be used by any entities involved in a transaction/activity.

The authentication insurance system 1004 may provide an insurance level or insurance score to the insurance entities 1090. In some cases, the authentication insurance system 1004 is a standalone system in communication with one or more parties involved in a transaction. In some cases, the authentication insurance system may be implemented as part of a service system value associated with a use of user credentials 1080 or a system associated with the insurance entities 1090. The authentication insurance service system may comprise memory storage units which may comprise non-transitory computer readable medium comprising code, logic, or instructions for performing one or more steps. The one or more processors of the authentication insurance system 1004 may be capable of executing one or more steps, for instance in accordance with the non-transitory computer readable media. In some embodiments, the one or more processors may generate or receive requests for generating insurance levels, processing the requests, identifying information needed for the authentications, and returning the insurance level result in response to the requests. The one or more databases may store various information, including but not limited to, various factors and the associated confidence scores as described previously, equations to calculate an insurance level, recommended insurance coverage plan, etc.

In some embodiments, the authentication insurance system 1004 may provide a pre-calculated or pre-computed insurance level along with the various factors used to determine the insurance level to the insurance entity 1090. In other embodiments, the authentication insurance system 1004 may calculate an insurance level in response to a request. The request may include a set of input variables including the factors as discussed previously to determine the insurance level. The request may be submitted by the insurance entity 1090.

The third-party entity 1070a, 1070b may include, but are not limited to, a merchant's system, a broker's system, a credit card company, a social network platform, a government department, a critical infrastructure, and/or other entities that may require user authentication. The third-party entity may be configured to offer various services to the user which may or may not include exchange of money and/or goods. The services may include any situation where authentication may be required using one or more credentials as discussed elsewhere herein. The services may be performed completely online (e.g., online shopping, online social networking, online registration and/or fee payments). The services may be performed completely in physical locations (e.g., shopping at a supermarket, backing services at a bank, registration at the city hall, etc.). The services may also include partially online activities in combination with partially physical activities.

The third-party entity 1070a, 1070b may be implemented on one or more standalone data processing apparatuses or a distributed network of computers. In some embodiments, the entity may also employ various virtual devices and/or services of third party service providers (e.g., third-party cloud service providers) to provide the underlying computing resources and/or infrastructure resources. In some embodiments, upon user's approval and in pursuance to related privacy policies, the third-party entity may or may not store account information, authentication information, and/or device information associated with the user. One or more third-party entities may comprise e-commerce systems, retail systems, financial institutions (e.g., banks, brokers, and credit card companies), merchant's systems, social networking platforms, and/or other entities which the user performs authentication with. In some instances, the third-party entity may be an online e-commerce, and a user may perform an authentication to complete a purchase of a product online. In some instance, the third-party entity may be a broker system, and a user may perform an authentication for verifying transfers of funds between the user's financial account and the broker system. In some instances, the third-party entity may be a social networking platform which hosts a plurality of user accounts. A user may use the authentication for verifying user's login to the social networking platform.

As illustrated in FIG. 10, a user (e.g., users 1005a, 1005b) may perform an authentication for a user activity. In one example, the user may perform a transaction of exchanging money, goods, and/or services with a third-party entity (e.g., third-party entities 1070a, 1070b). In another example, the user may purchase an item online from an e-commerce. In yet another example, the user may transfer money to a broker system. In another example, the user may login to a pre-registered user account on a social networking platform. In yet another example, the user may request access to a critical infrastructure or sensitive information. The user may perform the activity on a website or in an application associated with the third-party entity.

The user may or may not log into a registered user account with the third-party entity (e.g., a public service, an online voting system, a social networking service, etc.) to perform the activity. The user may or may not register to the authentication service 1080 prior to the activity/transaction.

In some embodiments, the third-party entity may send a request for an authentication to an authentication service system. The third-party entity may request for authentication per requirement of the third-party entity. Alternatively, the third-party entity may request for authentication per user accounting settings registered with the third-party entity.

After receiving the request from the third-party entity, the authentication service system may send a request to the user for the preferred credentials to be used for authentication. For example, the user may be allowed to perform the authentication using their currently available user credentials. After the authentication service system identifies the user credentials to be used, it may send the user identity-proofing information and user credential related information to the insurance entity 1090 to retrieve an insurance coverage plan.

In some cases, the insurance entity 1090 may further communicate with the authentication insurance system 1004 to generate an instant insurance level based on the instant variables collected by the service system 1080.

The third-party entity may instruct the service system 1080 to complete the authentication as protected by the insurance coverage.

In some alternative embodiments, the third-party entities may be enrolled in an insurance coverage plan prior to a transaction or activity. In this case, the third-party entities may request the authentication service system 1080 to perform the authentication as covered by the insurance coverage plan (e.g., credentials to be used, anti-replay features, etc).

Alternatively, the request to perform an authentication may be initiated by the user. The user may request an authentication of the third-party entity during a transaction. The process may be similar to the process as described previously.

Figure 11:
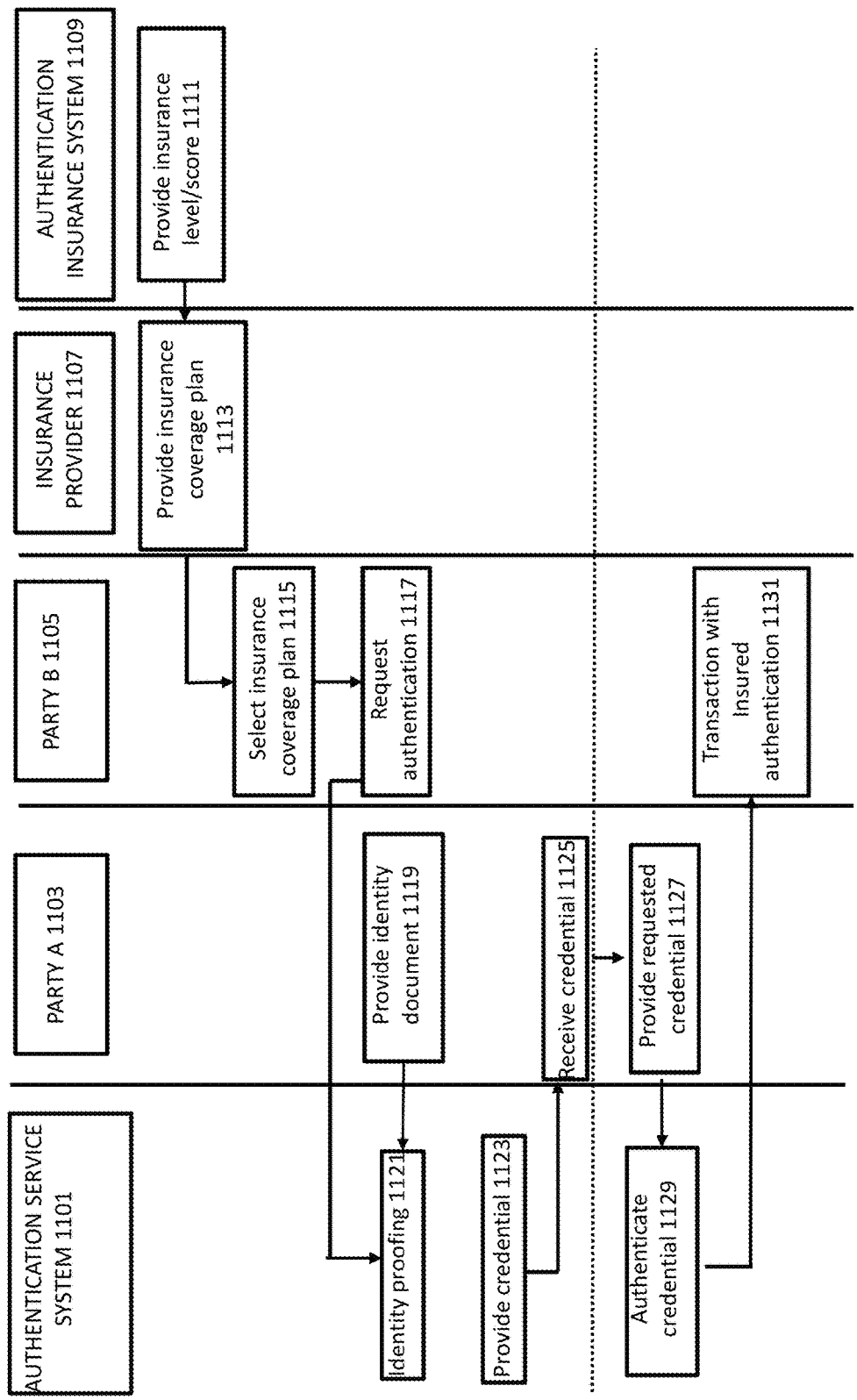
FIG. 11 provides examples illustrating different ways of using the insurance score, in accordance with embodiments of the invention.
Figure 12:
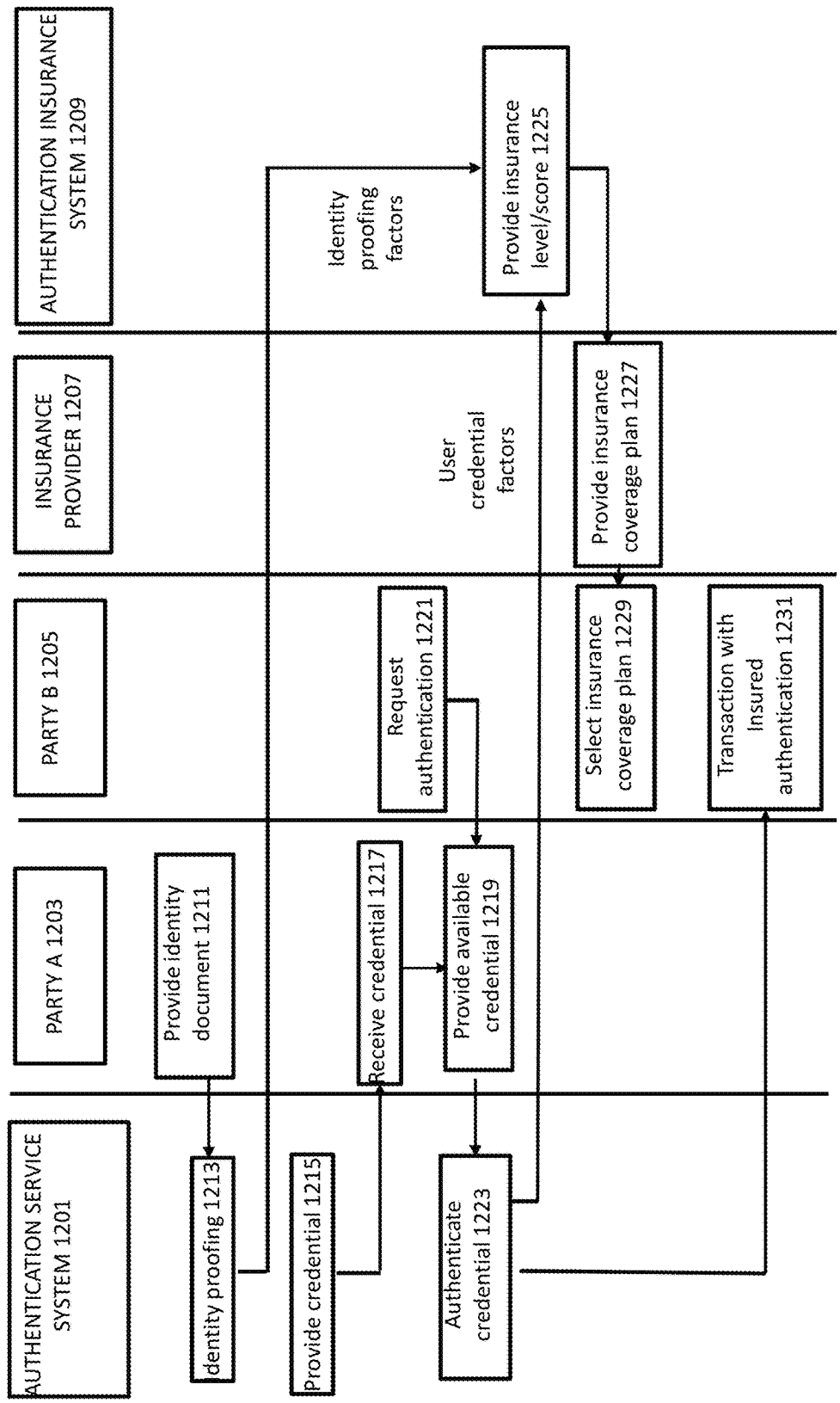
FIG. 12 provides additional examples illustrating different ways of using the insurance score, in accordance with embodiments of the invention.

As discussed previously, the insurance level may be pre-determined and stored in a lookup table. In other instances, the insurance level may be calculated instantly based on the variables for each transaction. The insurance level determined by the present invention can be provided at various time points. FIG. 11 and FIG. 12 provide examples illustrating different uses of the insurance score, in accordance with embodiments of the invention.

As illustrated in FIG. 11, PARTY A 1103 and PARTY B 1105 may be the entities engaged in an activity or transaction which is protected by an authentication insurance. In some cases, PARTY A can be a user and PARTY B can be a service provider or vice versa. The authentication insurance system 1109 may provide a pre-determined or pre-computed insurance level/score 1111 to an insurance service provider 1107. The authentication insurance system can be the same authentication insurance system 1004 as described in FIG. 10. In some cases, the pre-determined or pre-computed insurance level/score may be stored in a memory storage units coupled to or accessible by the authentication insurance system. The insurance provider 1107 may generate insurance coverage plan 1113 based on the insurance level/score. In some cases, one or more processors and computer readable medium of a system of the insurance provider may be used to generate the insurance coverage plan. The insurance coverage plan may include information such as the premium, coverage, identity-proofing documents and methods required for user identity-proofing and other factors related to user identity-proofing, user credentials and methods required for authentication and other factors related to the authentication process, etc. A plurality of insurance plans may be provided to PARTY B 1105. For instance, PARTY B may be allowed to view and select the insurance plans on a website hosted on a web server of the insurance provider. PARTY B may select the insurance plan based on the transactions with PARTY A which may include factors such as the amount of money or the availability of performing the authentication using one or more credentials 1115. After the insurance coverage plan is decided, PARTY B may request the authentication service system 1101 to perform authentications using the credentials and methods covered by the insurance coverage plan 1117. The authentication service system 1101 and the authentication insurance system 1109 may be separate systems. Alternatively, the authentication service system 1101 and the authentication insurance system 1109 can be an integrated single system. In some cases, the request for authentication is sent from PARTY B to the authentication service system directly. In some cases, the request for authentication is relayed to the authentication service system by the insurance provider. PARTY A 1103 may be pre-registered with the authentication service system 1101. In some cases PARTY A may be requested to provide one or more identity documents 1119 to the authentication service for identity proofing 1121 before an authentication is requested. In other cases, PARTY A may be requested to provide one or more identity documents to the authentication service system 1101 for identity proofing 1121 after an authentication is requested. After the identity-proofing, the authentication service system 1101 may provide user credentials 1123 to PARTY A. The user credentials may be provided according to the insurance coverage plan. PARTY A may use the credential for authentication as requested by PARTY B 1127. The authentication service system 1101 may authenticate the user credentials using the methods as indicated by the insurance coverage plan and may return the authentication result to PARTY B 1129. In some cases, the authentication result may include information indicating the identity of PARTY A and a confidence level of authentication. In some cases, the identity of PARTY A may not be provided to PARTY B. If the authentication passed, PARTY B may complete the transaction which is protected by the insurance coverage plan 1131.

In alternative embodiments, the insurance level/score may be determined in real time as various factors or variables collected from an identity proofing process and authentication process. FIG. 12 illustrates another example of providing an insured authentication, in accordance with embodiments of the invention. PARTY A 1203 may provide one or more identity documents 1211 to an authentication service system 1201 for identity proofing 1213. The authentication service system 1201 may perform identity proofing and provide credentials to PARTY A 1215. In some cases, information related to the user identity, associated credentials, and various factors such as the identity document used, the way the document is presented involved in identity-proofing process may be stored in a medium accessible to the authentication service system. The authentication service system 1201 may also provide information regarding the various factors involved in identity-proofing process to the authentication insurance system 1209. The information may include, for example, the identity document used, the way the document is presented and other factors such as location. The authentication service system 1201 and the authentication insurance system 1209 may be separate systems. Alternatively, the authentication service system 1201 and the authentication insurance system 1209 can be an integrated single system. PART B 1205 may initiate an authentication request 1221 to request PARTY A 1203 for providing available credential 1219 to the authentication service system 1201 for authentication. PARTY A may be allowed to select some or all of the credentials for authentication. In some cases, PARTY A may select a credential based on availability or convenience. In some cases, PARTY may select a credential based on a desired security level. The credentials used for the authentication may be some or all of the credentials provided to PARTY A by the authentication service system. The authentication service system 1201 may authenticate the credentials 1223 as well as transmit data to the authentication insurance system 1209 related to the user credential related factors such as a type of credentials, an identity of the credentials, anti-replay feature, etc. In response to receiving the data related to the user credential related factors, the authentication insurance system 1209 may generate an insurance level/score 1225 and provide the insurance level/score to an insurance provider 1207. The insurance level/score may be generated using the method described elsewhere herein. For example, one or more processors of the authentication insurance system may be configured to determine an identity-proofing confidence score based on the identity-proofing related information stored in the memory, and determine a user credential confidence score based on the data related to the credentials used for authentication, then calculated an insurance level/score according to the identity-proofing confidence score and the user credential confidence score. The insurance provider 1207 may provide an insurance coverage plan 1227 to PARTY B according to the insurance level/score. In some cases, the insurance coverage plan is determined according to a pre-determined correlation between the insurance level/score and the insurance coverage plan. In some cases, the insurance coverage plan is determined based on additional factors such as a historic data of PARTY A and/or PARTY B (e.g., authentication history, authentication history). PARTY B may select an option provided by the insurance plan based on a desired security level of the transaction associated with PARTY A. Once the authentication is passed, transaction may be completed with the insurance coverage 1231.

Figure 13:
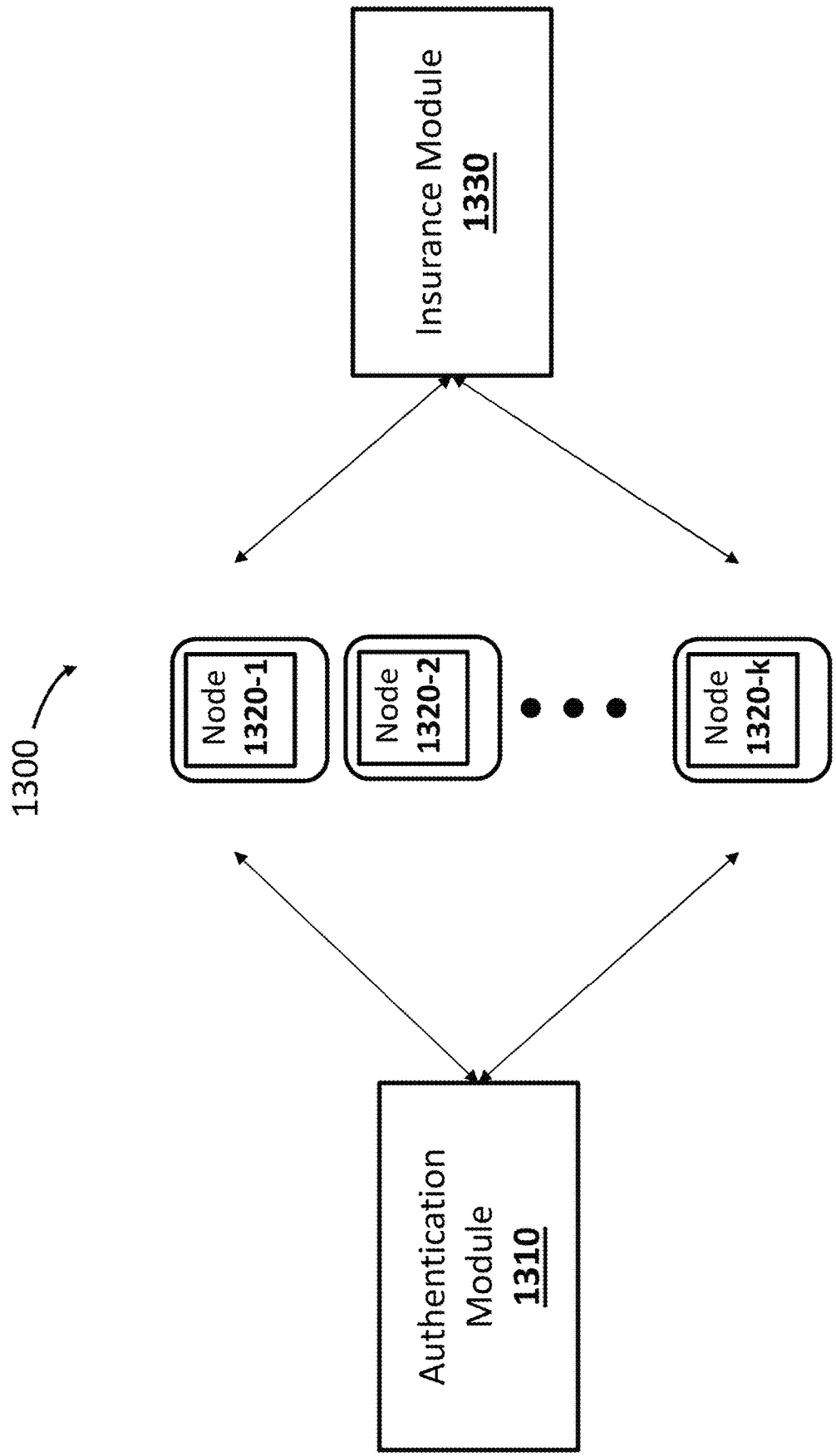
FIG. 13 shows an exemplary network protected by authentication insurance, in accordance with embodiments of the invention.

FIG. 13 shows an exemplary network 1300 protected by authentication insurance. The network 1300 may comprise a plurality of nodes 1320-1, 1320-2, 1320-k, an authentication module 1310 and an insurance module 1330. A node may be any device equipped with communication capabilities. The communications may be wired or wireless communications. The node may be operating over various technologies such as Global System for Mobile communication (GSM), Universal Mobile Telecommunications System (UMTS), High Speed Downlink Packet Access (HSDPA), Code Division Multiple Access (CDMA), Long Term Evolution (LTE), Worldwide Interoperability for Microwave Access (Wi-MAX) and infrastructure IEEE 802.11 variants, such as IEEE 802.11a/b/g/n/ac and various others. A node may be a Bluetooth or Wi-Fi enabled device, such as laptops, cellular phones, Personal Digital Assistant (PDA), Smartphone, HSDPA terminal, CSMA terminal and various other access terminals. A node can operate as a broadcast node, relay node, source node, sink node or recipient node in the network. A node may or may not be mobile.

A node can be various types of computing devices such as personal computers, tablet computers, smart phones, set top boxes, desktop computers, laptops, gaming systems, servers, data centers, and various other devices or systems. A node can be any type of network devices. The plurality of nodes may establish communications with others devices or systems in the network (e.g., authentication server 1310, insurance server 1330, other third party server, etc). The network can be wireless network, wired network or a combination of both. For example, the network may comprise one or more of the Internet, an intranet, a cellular network, a home network, a person area network, etc., through an ISP, cellular, or broadband cable provider, and the like. The network can comprise an internet protocol interfaces, such as one or more network components, data servers, connection nodes, switches, and the like. In some cases, the plurality of nodes can be considered as part of the network. The plurality of nodes may be configured to run any suitable applications for conducting a transaction.

The network may comprise an insurance module 1330 for determining level of protection of transaction performed by the nodes. In some embodiments, the insurance module may be implemented on an insurance server. The insurance module may optionally be implemented on a network device. The insurance module can be implemented by software, hardware or a combination of both. In some cases, the insurance module may be configured to determine a protection level on the fly according to the authentication credential, various identity proofing factors associated with a transaction. This process may be similar to the process described in FIG. 12. In some cases, the insurance module may be configured to determine a plurality of protection levels for transactions performed by the node for selection. The transaction may then be protected based on a selected insurance protection level.

The insurance module 1330 may be in communication with the authentication module 1310 over the network. The authentication module 1310 may be configured to perform authentication per transaction that is protected by the insurance module. In some embodiments, the authentication module is implemented on an authentication server. The authentication module may optionally be implemented on a network device. The authentication module can be implemented by software, hardware or a combination of both. The authentication server can be the same as the authentication service system as described in FIG. 11 or FIG. 12. The authentication module may authenticate device ID of the node, identity of the parties involved in the transaction via the node. In some cases, the authentication module may authenticate the transaction based on a status of the node. For instance, the authentication module may detect replay attack based on nonce data related to the status of the node.

In some embodiments, the network may comprise a memory storage unit storing data about the one or more credentials provided to the user. The memory storage unit may comprise one or more databases for storing various information as described elsewhere herein. The memory storage unit may be coupled to the authentication module and/or the insurance module. The one or more databases may store various information, including but not limited to, various factors and the associated confidence scores as described previously, equations to calculate an insurance level, recommended insurance coverage plan, etc. In example, an insurance level may be generated based on a plurality of factors. The plurality of factors may be automatically detected by the system or by one or more devices coupled to the system and stored in the database. In some cases, the one or more databases may store various information obtained during user registration process and features engaged in an authentication processes. The various information may include but not limited to, user identity information, identity proofing document information, authentication or presentation methods, user provided information associated with their account (e.g., challenge questions, username, password), information regarding credentials issued to the user such as pre-registered card information (e.g., encoded data, magnetic fingerprint data, and/or swipe characteristics) of one or more cards of the user associated with a card reader, pre-registered account information of the user associated with the card reader, pre-registered device information of the user device(s) which may have interactions with the card reader, pre-registered device identifier of the card reader, historic authentication reads data using the card reader, registration data registered using the card reader, and various other factors collected during the identity proofing process (e.g., location, time, public notary) and various features of the credentials. The databases may also store information regarding various features of the later authentication processes. These factors may be related to a user credential confidence score such as the credential to be authenticated, presence of anti-replay features and any other factors as described elsewhere herein.

In one aspect, a computer implemented method of determining an security level for identity authentication by an authentication insurance system is provided. The computer implemented method comprises: determining, with aid of one or more processors, an identity-proofing confidence score, wherein the identity-proofing confidence score is determined based at least in part on (i) an identity document confidence score which is associated with a security feature of an identity document that is used for identity-proofing, and (ii) a presentation method confidence score associated with a method used for presenting the identity document; determining, with aid of the one or more processors, a credential authentication confidence score, wherein the credential authentication confidence score is determined based on (i) a credential confidence score associated with a credential used for authentication, and (ii) a presence of an anti-replay feature during the identity authentication; and determining, with aid of the one or more processors, an insurance level based on the identity-proofing confidence score and the credential authentication confidence score with aid of one or more processors of the authentication insurance system, wherein the insurance level is useful for generating an insurance coverage plan for the identity authentication.

In some embodiments, the security feature indicates the strength of the identity document to resist counterfeit. In some embodiments, the method used for presenting the identity document comprises knowing the identity document, showing the identity document, presenting the identity document remotely, showing the identity document in-person, or proving the identity document in-person. In some embodiments, the credential confidence score is associated with an assurance level of the credential or the likelihood of authentication error when using the credential for verifying an identity of a user. In some embodiments, the credential comprises password, visual token, physical token or biometrics of a user.

In some embodiments, the anti-replay feature comprises using nonce data to detect a replay attack. In some cases, the nonce data is generated using device state data which is about a physical state of a device used during the identity authentication or using characteristic data of the credential. In some cases, the device state data comprises data collected by multiple types of sensors. In some cases, the device state data comprises positional information about the device, data indicative of environmental information collected by one or more sensors on-board the device, or local data indicative of a physical state of a component of the device, and wherein the component is selected from the group comprising a power supply unit, a processor, a sensor, and a memory. In some cases, the characteristic data of the credential comprises data generated during processing the credential by the user device or data indicating a motion when performing the identity authentication using the credential.

In some embodiments, the identity-proofing confidence score is determined further based on a location where the identity document is presented.

In some embodiments, the method further comprises supplying, by an insurance provider, the insurance coverage plan to a user and/or an entity involved in a transaction with the user, wherein the insurance coverage plan provides coverage for the user and/or the entity against a loss resulting from the identity of the counterpart in the transaction being different than the identified person, persons, or entity.

In another aspect, a method for determining an insurance coverage plan for identity authentication is provided. The method comprises: receiving, from an authentication service system, data about identity-proofing of a user, wherein the data about identity-proofing comprises a type of identity document of the user and a presentation method used for verifying the user's identity by the authentication service system; determining, with aid of one or more processors, an identity-proofing confidence score based on the data about identity-proofing; generating, with aid of the one or more processors, a plurality of insurance levels for the user, wherein each of the plurality of insurance levels is generated based on the identity-proofing confidence score and a credential authentication confidence score according to a pre-determined relationship, and wherein the credential authentication confidence score is determined based on a credential to be used for a transaction and a presence of an anti-replay feature; providing a plurality of insurance coverage plans associated with the plurality of insurance levels to the user for selection; and performing, by the authentication service system, credential authentication according to a selected insurance coverage plan.

In some embodiments, the data about identity-proofing of a user is stored in a memory unit accessible to the authentication service system.

In some embodiments, the user is provided with one or more credentials by the authentication service system upon verification of the user's identity.

In some embodiments, the method further comprises storing data about the one or more credentials provided to the user. In some case, the credential to be used for the transaction is selected from the one or more credentials provided to the user.

In some embodiments, the anti-replay feature comprises using nonce data to detect a replay attack. In some cases, the nonce data is generated using device state data about a physical state of a device used for the credential authentication or using characteristic data of the credential. In some cases, the pre-determined relationship is stored in a memory unit accessible to the system.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A system for facilitating distribution of authentication information for a network of devices to be authenticated, comprising an authentication module configured to obtain an identity-proofing confidence score, based on data about identity-proofing of a user obtained from an authentication service system, wherein the data about identity-proofing comprises a type of identity document of the user and a presentation method used for verifying the user's identity by the authentication service system; and an insurance module in communication with the authentication module, configured to generate a plurality of security levels, wherein each of the plurality of security levels is generated based on the identity-proofing confidence score and a credential authentication confidence score that is (1) obtained with aid of at least one device from the network of devices, and (2) determined based on a credential to be used for a transaction and a presence of an anti-replay feature about the at least one device, wherein the anti-replay feature comprises use of nonce data to detect a replay attack and wherein the nonce data is generated using device state data about a physical state of a device used for the credential authentication or using characteristic data of the credential;

wherein a display is configured to show a plurality of coverage plans associated with the plurality of security levels to the user for selection, such that the authentication service system performed credential authentication according to a selected coverage plan.

2. The system of claim 1, wherein the data about identity-proofing of a user is stored in a memory unit accessible to the authentication service system.

3. The system of claim 1, wherein the user is provided with one or more credentials by the authentication service system upon verification of the user's identity.

4. The system of claim 1, further comprising a memory unit storing data about the one or more credentials provided to the user.

5. The system of claim 1, wherein the credential to be used for the transaction is selected from the one or more credentials provided to the user.

6. A computer implemented method for facilitating authentication information distribution for a network of devices to be authenticated, comprising:
 obtaining, at an authentication module, an identity-proofing confidence score, based at least in part on (i) an identity document confidence score which is associated with a security feature of an identity document that is used for identity-proofing, and (ii) a presentation method confidence score associated with a method used for presenting the identity document;
 obtaining, with aid of a least one device of the network of devices, a credential authentication confidence score, wherein the credential authentication confidence score is determined based on (i) a credential confidence score associated with a credential used for authentication, and (ii) a presence of an anti-replay feature during the identity authentication, wherein the anti-replay feature comprises use of nonce data to detect a replay attack and wherein the nonce data is generated using device state data about a physical state of a device used for the credential authentication or using characteristic data of the credential; and
 determining an insurance level, based on the identity-proofing confidence score obtained at the authentication module and the credential authentication confidence score obtained with aid of the at least one device, wherein the insurance level is useful for generating an insurance coverage plan for the identity authentication.

7. The method of claim 6, wherein the security feature indicates the strength of the identity document to resist counterfeit.

8. The method of claim 6, wherein the presentation method used for presenting the identity document comprises knowing the identity document, showing the identity document, presenting the identity document remotely, showing the identity document in-person, or proving the identity document in-person.

9. The method of claim 6, wherein the credential confidence score is associated with an assurance level of the credential or the likelihood of authentication error when using the credential for verifying an identity of a user.

10. The method of claim 6, wherein the credential comprises password, visual token, physical token or biometrics of a user.

11. The method of claim 6, wherein the device state data comprises data collected by multiple types of sensors.

12. The method of claim 6, wherein the device state data comprises positional information about the device, data indicative of environmental information collected by one or more sensors on-board the device, or local data indicative of a physical state of a component of the device, and wherein the component is selected from the group comprising a power supply unit, a processor, a sensor, and a memory.

13. The method of claim 6, wherein the characteristic data of the credential comprises data generated during processing the credential by the user device or data indicating a motion when performing the identity authentication using the credential.

14. The method of claim 6, wherein the identity-proofing confidence score is determined further based on a location where the identity document is presented.

15. The method of claim 6, further comprising supplying, by an insurance provider, the insurance coverage plan to a user and/or an entity involved in a transaction with the user, wherein the insurance coverage plan provides coverage for the user and/or the entity against a loss resulting from the identity of the counterpart in the transaction being different than the identified person, persons, or entity.

16. A computer implemented method for facilitating authentication information distribution for a network of devices to be authenticated, comprising:
 obtaining, at an authentication module, an identity-proofing confidence score, based at least in part on (i) an identity document confidence score which is associated with a security feature of an identity document that is used for identity-proofing, and (ii) a presentation method confidence score associated with a method used for presenting the identity document;
 obtaining, with aid of a least one device of the network of devices, a credential authentication confidence score, wherein the credential authentication confidence score is determined based on (i) a credential confidence score associated with a credential used for authentication, and (ii) a presence of an anti-replay feature during the identity authentication;
 determining an insurance level, based on the identity-proofing confidence score obtained at the authentication module and the credential authentication confidence score obtained with aid of the at least one device, wherein the insurance level is useful for generating an insurance coverage plan for the identity authentication; and
 supplying, by an insurance provider, the insurance coverage plan to a user and/or an entity involved in a transaction with the user, wherein the insurance coverage plan provides coverage for the user and/or the entity against a loss resulting from the identity of the counterpart in the transaction being different than the identified person, persons, or entity.

* * * * *